US012793703B2

(12) United States Patent
Nandwana et al.

(10) Patent No.: US 12,793,703 B2
(45) Date of Patent: Nov. 10, 2026

(54) CROSS-MODAL TRAINING OF A MACHINE-LEARNING MODEL THAT IDENTIFIES ABUSE IN AUDIO STREAMS

(71) Applicant: Roblox Corporation, San Mateo, CA (US)

(72) Inventors: Mahesh Kumar Nandwana, Sunnyvale, CA (US); Joseph Liu, San Mateo, CA (US); Morgan Samuel McGuire, Vancouver (CA); Kiran Bhat, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 42 days.

(21) Appl. No.: 18/811,550

(22) Filed: Aug. 21, 2024

(65) Prior Publication Data

US 2025/0069596 A1 Feb. 27, 2025

Related U.S. Application Data

(60) Provisional application No. 63/563,240, filed on Mar. 8, 2024, provisional application No. 63/614,697, filed
(Continued)

(51) Int. Cl.
*G10L 15/08* (2006.01)
*G10L 13/02* (2013.01)
(Continued)

(52) U.S. Cl.
CPC .............. *G10L 15/08* (2013.01); *G10L 13/02* (2013.01); *G10L 15/04* (2013.01); *G10L 15/063* (2013.01);
(Continued)

(58) Field of Classification Search
CPC . G10L 15/183; G10L 2015/188; G10L 15/16; G10L 2015/08
See application file for complete search history.

(56) References Cited

U.S. PATENT DOCUMENTS

| | | | | |
|---|---|---|---|---|
| 6,983,242 | B1 * | 1/2006 | Thyssen | G10L 25/78 704/E19.041 |
| 11,458,409 | B2 | 10/2022 | Thomas et al. | |

(Continued)

OTHER PUBLICATIONS

Aneri Rana, et al., "Emotion Based Hate Speech Detection using Multimodal Learning", Cornell University Library, Feb. 13, 2022, 1-9.

(Continued)

*Primary Examiner* — Shaun Roberts
(74) *Attorney, Agent, or Firm* — IP Spring

(57) ABSTRACT

A metaverse application receives a user-provided audio stream associated with a user. The metaverse application obtains portions of one or more audio streams. The metaverse application divides the user-provided audio stream into a plurality of portions, wherein each portion corresponds to a particular time window of the audio stream. The metaverse application providing the plurality of portions of the user-provided audio stream as input to an audio machine-learning model. The audio machine-learning model outputs, based on the portions of the user-provided audio stream, a determination of abuse in a particular portion of the plurality of portions. The metaverse application performs a remedial action responsive to the determination of abuse in the particular portion.

20 Claims, 15 Drawing Sheets

Related U.S. Application Data on Dec. 26, 2023, provisional application No. 63/534,086, filed on Aug. 22, 2023.

(51) Int. Cl.

| | |
|---|---|
| ***G10L 15/04*** | (2013.01) |
| ***G10L 15/06*** | (2013.01) |
| ***G10L 15/183*** | (2013.01) |
| ***G10L 21/0216*** | (2013.01) |
| ***G10L 21/028*** | (2013.01) |
| ***G10L 25/84*** | (2013.01) |
| *G10L 15/30* | (2013.01) |

(52) U.S. Cl.

CPC ........ *G10L 15/183* (2013.01); *G10L 21/0216* (2013.01); *G10L 21/028* (2013.01); *G10L 25/84* (2013.01); *G10L 2015/088* (2013.01); *G10L 15/30* (2013.01)

(56) References Cited

U.S. PATENT DOCUMENTS

| | | | | |
|---|---|---|---|---|
| 2015/0117662 | A1* | 4/2015 | Kulavik | G10L 25/51 381/74 |
| 2017/0076725 | A1* | 3/2017 | Kumar | G10L 15/10 |
| 2019/0052471 | A1* | 2/2019 | Panattoni | H04L 67/306 |
| 2019/0356956 | A1* | 11/2019 | Sheng | H04N 21/4665 |
| 2020/0125639 | A1* | 4/2020 | Doyle | G06N 3/08 |
| 2020/0142999 | A1* | 5/2020 | Pedersen | G06F 16/35 |
| 2021/0201934 | A1* | 7/2021 | Lyu | G06N 3/0464 |
| 2021/0335345 | A1* | 10/2021 | Cameron-Kidd | G06F 40/295 |
| 2022/0284884 | A1* | 9/2022 | Tongya | G06F 40/35 |
| 2023/0018384 | A1* | 1/2023 | Finkelstein | G10L 13/033 |
| 2023/0162722 | A1* | 5/2023 | Li | G06F 18/2415 704/243 |
| 2023/0317059 | A1* | 10/2023 | Rosenberg | G06N 3/08 704/232 |
| 2023/0396457 | A1* | 12/2023 | Huffman | H04L 12/1822 |
| 2024/0354648 | A1* | 10/2024 | Curtin | G06N 20/00 |
| 2024/0370662 | A1* | 11/2024 | Khani | G06F 40/30 |
| 2024/0386048 | A1* | 11/2024 | Russell | G06F 16/4393 |

OTHER PUBLICATIONS

Chen, et al., "WavLM: Large-Scale Self-Supervised Pre-Training for Full Stack Speech Processing", IEEE Journal of Selected Topics in Signal Processing 16.6, 2022, 14 pages.
EPO, International Search Report for International Patent Application No. PCT/US2024/043263, Dec. 17, 2024, 6 pages.
EPO, Written Opinion for International Patent Application No. PCT/US2024/043263, Dec. 17, 2024, 9 pages.
Liu, et al., "Enhancing Multilingual Voice Toxicity Detection with Speech-Text Alignment", arXiv preprint arXiv:2406.10325, 2024, 5 pages.
Nandwana, et al., "Voice Toxicity Detection Using Multi-Task Learning", ICASSP 2024-2024 IEEE International Conference on Acoustics, Speech and Signal Processing (ICASSP), 2024, 5 pages.
Rana, et al., "Emotion Based Hate Speech Detection using Multimodal Learning", arXiv preprint arXiv:2202.06218, 2022, 9 pages.
"Two Hat," https://www.twohat.com/community-sift, 2023, 7 pages.
Aluru, et al., "Deep learning models for multilingual hate speech detection," arXiv preprint arXiv:2004.06465, 2020, 16 pages.
Artetxe, et al., "Massively Multilingual Sentence Embeddings for Zero-Shot Cross-Lingual Transfer Beyond," Transactions of the Association for Computational Linguistics, vol. 7, 2019, pp. 597-610.
Baevski, et al., "wav2vec 2.0: a framework for self-supervised learning of speech representations," Advances in neural information processing systems, vol. 33, 2020, pp. 12 449-12 460.
Busso, et al., "lemocap: interactive emotional dyadic motion capture database," Language resources and evaluation, vol. 42, 2008, pp. 335-359.
Chen, et al., "gradnorm: gradient normalization for adaptive loss balancing in deep multitask networks," International conference on machine learning, PMLR, 2018, 10 pages.
Chen, et al., "Small-footprint keyword spotting using deep neural networks," 2014 IEEE international conference on acoustics, speech and signal processing (ICASSP), 2014, 5 pages.
Duquenne, et al., "Multimodal and multilingual embeddings for large-scale speech mining," in Advances in Neural Information Processing Systems, 34, 2021, pp. 15748-15761.
Ghosh, et al., "DeToxy: a large-scale multimodal dataset for toxicity classification in spoken utterances," Proc. Interspeech 2022, 2022, pp. 5185-5189.
Gupta, et al., "Adima: abuse detection in multilingual audio," ICASSP 2022-2022 IEEE International Conference on Acoustics, Speech and Signal Processing (ICASSP), 2022, pp. 6172-6176.
Houlsby, et al., "Parameter-efficient transfer learning for nlp," International conference on machine learning, PMLR, 2019, 10 pages.
Jonathan, et al., "Conditionally adaptive multi-task learning: improving transfer learning in nlp using fewer parameters & less data," arXiv preprint arXiv:2009.09139, 2020, 22 pages.
Kendall, et al., "Multi-task learning using uncertainty to weigh losses for scene geometry and semantics," Proceedings of the IEEE conference on computer vision and pattern recognition, 2018, 10 pages.
Kim, et al., "Comparing kullback-leibler divergence and mean squared error loss in knowledge distillation," Proceedings of the Thirtieth International Joint Conference on Artificial Intelligence, 2021, pp. 2628-2635.
Le, et al., "How we scaled BERT to serve 1+ billion display requests on CPUs," 2023, 21 pages.
Lin, et al., "Toxic speech and speech emotions: Investigations of audio-based modeling and intercorelations," 30th European Signal Processing Conference (EUSIPCO), 2022, pp. 115-119.
Malik, et al., "Toxic speech detection using traditional machine learning models and bert and fasttext embedding with deep neural networks," 2021 5th International Conference on Computing Methodologies and Communication (ICCMC), IEEE, 2021, 6 pages.
Martens, et al., "Toxicity detection in multiplayer online games," 2015 International Workshop on Network and Systems Support for Games (NetGames), 2015, 7 pages.
Muennighoff, et al., "MTEB: massive text embedding benchmark," Proceedings of the 17th Conference of the European Chapter of the Association for Computational Linguistics, 2023, pp. 2014-2037.
Nada, et al., "Lightweight toxicity detection in spoken language: a transformer-based approach for edge devices," arXiv preprint arXiv:2304.11408, 2023, 11 pages.
Radford, et al., "Robust Speech Recognition via Large-Scale Weak Supervision," International conference on machine learning, PMLR, 2023, 28 pages.
Risch, et al., "Toxic comment detection in online discissions," Deep learning-based approaches for sentiment analysis, Singapore: Springer Singapore, 2020, pp. 85-109.
Rosa, et al., "Automatic cyberbullying detection: a systematic review," Computers in Human Behavior 93, 2019, pp. 333-345.
Sainath, et al., "Convolutional neural networks for small-footprint keyword spotting," 2015, 5 pages.
Sanh, et al., "Distilbert, a distilled version of berg: smaller, faster, cheaper and lighter," arXiv preprint arXiv:1910.01108, 2019, 5 pages.
Sohn, "Improved deep metric learning with multi-class n-pair loss objective," Advances in Neural Information Processing Systems, 2016, 9 pages.
Tüske, et al., "Investigation on LSTM recurrent n-gram language models for speech recognition," Interspeech, 2018, 5 pages.
Yang, et al., "Superb: speech processing universal performance benchmark," arXiv preprint arXiv:2105.01051, 2021, 6 pages.
Ye, et al., "Cross-modal contrastive learning for speech translation," Proc. of NAACL, 2022, 15 pages.
Yousefi, et al., "Audio-based toxic language classification using self-attentive convolution neural network," 29th European Signal Processing Conference (EUSIPCO), 2021, pp. 11-15.

(56) References Cited

OTHER PUBLICATIONS

Zhao, et al., "Shallow-fusion end-to-end contextual biasing," Interspeech, 2019, 5 pages.

* cited by examiner

CROSS-MODAL TRAINING OF A MACHINE-LEARNING MODEL THAT IDENTIFIES ABUSE IN AUDIO STREAMS

CROSS-REFERENCE TO RELATED APPLICATIONS

This application is a non-provisional application that claims priority under 35 U.S.C. § 119(e) to U.S. Provisional Patent Application No. 63/534,086, filed on Aug. 22, 2023; U.S. Provisional Patent Application No. 63/614,697, filed on Dec. 26, 2023; and U.S. Provisional Patent Application No. 63/563,240, filed on Mar. 8, 2024, the contents of each of which are hereby incorporated by reference herein in its entirety.

TECHNICAL FIELD

Embodiments relate generally to online virtual experience platforms, and more particularly, to methods, systems, and computer readable media for identifying abuse in audio streams.

BACKGROUND

Abuse in a virtual environment occurs in multiple ways. For example, avatars may wear offensive outfits, players may perform offensive actions, players may say offensive (abusive) things in audio chat, and/or players may type offensive words into a group chat. Moderating audio in real-time communications is difficult because of the volume of audio that moderators would have to review in a short time period, when a large number of players participate in the virtual environment. The longer the delay between a violation and a disciplinary action in response to the violation, the more likely that a player will continue to commit abuse in the virtual environment.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method performs moderation of audio streams. The method comprises receiving a user-provided audio stream associated with a user. The method further includes dividing the user-provided audio stream into a plurality of portions, wherein each portion corresponds to a particular time window of the audio stream. The method further includes providing the plurality of portions of the user-provided audio stream as input to an audio machine-learning model. The method further includes outputting, by the audio machine-learning model and based on the portions of the user-provided audio stream, a determination of abuse in a particular portion of the plurality of portions. The method further includes performing a remedial action responsive to the determination of abuse in the particular portion.

In some embodiments, the audio machine-learning model is trained by: providing audio input to an audio encoder; outputting, by the audio encoder and based on the audio input, audio embeddings corresponding to the audio input and voice toxicity classification that identifies one or more toxic labels to associate with the audio input; providing text input to a text encoder, wherein the text input is a transcription of the audio input; outputting, by the text encoder and based on the text input, text embeddings; determining a value of a text injection loss function based on comparison of the audio embeddings and the text embeddings; and adjusting one or more parameters of the audio encoder to reduce the value of the text injection loss function.

In some embodiments, the audio input includes real-world audio associated with abuse reports from one or more users and the method further comprises: comparing the voice toxicity classification to labels associated with the real-world audio to determine a value of a classifier loss function, wherein the labels associated with the real-world audio are ground truth provided by human reviewers; and adjusting parameters of the audio encoder to reduce the value of the classifier loss function. In some embodiments, the audio machine-learning model is trained using training data and the method further comprises generating the training data by: receiving training audio streams of one or more people speaking; for each training audio stream: dividing the training audio stream into two or more audio segments; transcribing the two or more audio segments into two or more textual segments; and generating, with a first classifier, a first segment label for each of the two or more textual segments, wherein the first segment label indicates whether a textual segment is toxic or non-toxic; and adding the training audio stream, the two or more textual segments, and corresponding first segment labels from the training audio streams to a training data set. In some embodiments, generating the training data further includes: identifying, from the training audio streams, a subset of the training audio streams where one or more of the first segment labels indicate that one or more of the textual segments is toxic; generating, with a second classifier, second segment labels for the subset of the training audio streams, wherein the second classifier is more accurate at identifying instances of abuse than the first classifier; and adding the second segment labels to the training set.

In some embodiments, the audio machine-learning model is trained using synthetic training data and the method further comprises generating the synthetic training data by: providing voice chat audio to an automatic speech recognition (ASR) system; outputting, by the ASR system, transcribed audio based on the voice chat audio; providing the transcribed audio and a prompt specifying new text characteristics to a large language model (LLM), the LLM configured to generate new text based on the prompt and the transcribed audio; providing the voice chat audio to a voice cloner that outputs audio tokens that preserve speaker characteristics in the voice chat audio; providing the new text and the audio tokens as input to a text to speech system; and outputting, by the text to speech system, the synthetic training.

In some embodiments, the remedial action includes providing a warning to the user. In some embodiments, the remedial action includes at least one of: causing a microphone on a user device associated with the user to be muted or suppressing the user-provided audio stream from being delivered to one or more other users. In some embodiments, the determination of abuse includes an identification of a type of abuse, the type of abuse selected from a group of one or more of profanity, bullying, harassment, sexism, and combinations thereof.

In some embodiments, prior to receiving the user-provided audio stream, the method further comprises filtering, by a voice activity detection (VAD) model, the user-provided audio stream to remove parts of the audio stream that do not include human speech. In some embodiments, the method further includes filtering the user-provided audio stream to remove background noise.

A system to moderate audio streams, the system including one or more processors; and a memory coupled to the one or more processors, with instructions stored thereon that, when executed by the processor, cause the processor to perform operations. The operations include: receiving a user-provided audio stream associated with a user; dividing the user-provided audio stream into a plurality of portions, wherein each portion corresponds to a particular time window of the audio stream; providing the plurality of portions of the user-provided audio stream as input to an audio machine-learning model; outputting, by the audio machine-learning model and based on the portions of the user-provided audio stream, a determination of abuse in a particular portion of the plurality of portions; and performing a remedial action responsive to the determination of abuse in the particular portion.

In some embodiments, the audio machine-learning model is trained by: providing audio input to an audio encoder; outputting, by the audio encoder and based on the audio input, audio embeddings corresponding to the audio input and voice toxicity classification that identifies one or more toxic labels to associate with the audio input; providing text input to a text encoder, wherein the text input is a transcription of the audio input; outputting, by the text encoder and based on the text input, text embeddings; determining a value of a text injection loss function based on comparison of the audio embeddings and the text embeddings; and adjusting one or more parameters of the audio encoder to reduce the value of the text injection loss function.

In some embodiments, the audio input includes real-world audio associated with abuse reports from one or more users and the operations further include: comparing the voice toxicity classification to labels associated with the real-world audio to determine a value of a classifier loss function, wherein the labels associated with the real-world audio are ground truth provided by human reviewers; and adjusting parameters of the audio encoder to reduce the value of the classifier loss function. In some embodiments, the audio machine-learning model is trained using training data and the operations further include generating the training data by: receiving training audio streams of one or more people speaking; for each training audio stream: dividing the training audio stream into two or more audio segments; transcribing the two or more audio segments into two or more textual segments; and generating, with a first classifier, a first segment label for each of the two or more textual segments, wherein the first segment label indicates whether a textual segment is toxic or non-toxic; and adding the training audio stream, the two or more textual segments, and corresponding first segment labels from the training audio streams to a training data set.

A non-transitory computer-readable medium with instructions stored thereon that, when executed by one or more computers, cause the one or more computers to perform operations. The operations include: receiving a user-provided audio stream associated with a user; dividing the user-provided audio stream into a plurality of portions, wherein each portion corresponds to a particular time window of the audio stream; providing the plurality of portions of the user-provided audio stream as input to an audio machine-learning model; outputting, by the audio machine-learning model and based on the portions of the user-provided audio stream, a determination of abuse in a particular portion of the plurality of portions; and performing a remedial action responsive to the determination of abuse in the particular portion.

In some embodiments, the audio machine-learning model is trained by: providing audio input to an audio encoder; outputting, by the audio encoder and based on the audio input, audio embeddings corresponding to the audio input and voice toxicity classification that identifies one or more toxic labels to associate with the audio input; providing text input to a text encoder, wherein the text input is a transcription of the audio input; outputting, by the text encoder and based on the text input, text embeddings; determining a value of a text injection loss function based on comparison of the audio embeddings and the text embeddings; and adjusting one or more parameters of the audio encoder to reduce the value of the text injection loss function.

In some embodiments, the audio input includes real-world audio associated with abuse reports from one or more users and the operations further include: comparing the voice toxicity classification to labels associated with the real-world audio to determine a value of a classifier loss function, wherein the labels associated with the real-world audio are ground truth provided by human reviewers; and adjusting parameters of the audio encoder to reduce the value of the classifier loss function. In some embodiments, the audio machine-learning model is trained using training data and the operations further include generating the training data by: receiving training audio streams of one or more people speaking; for each training audio stream: dividing the training audio stream into two or more audio segments; transcribing the two or more audio segments into two or more textual segments; and generating, with a first classifier, a first segment label for each of the two or more textual segments, wherein the first segment label indicates whether a textual segment is toxic or non-toxic; and adding the training audio stream, the two or more textual segments, and corresponding first segment labels from the training audio streams to a training data set. In some embodiments, the remedial action includes providing a warning to the user.

DETAILED DESCRIPTION

Figure 1:
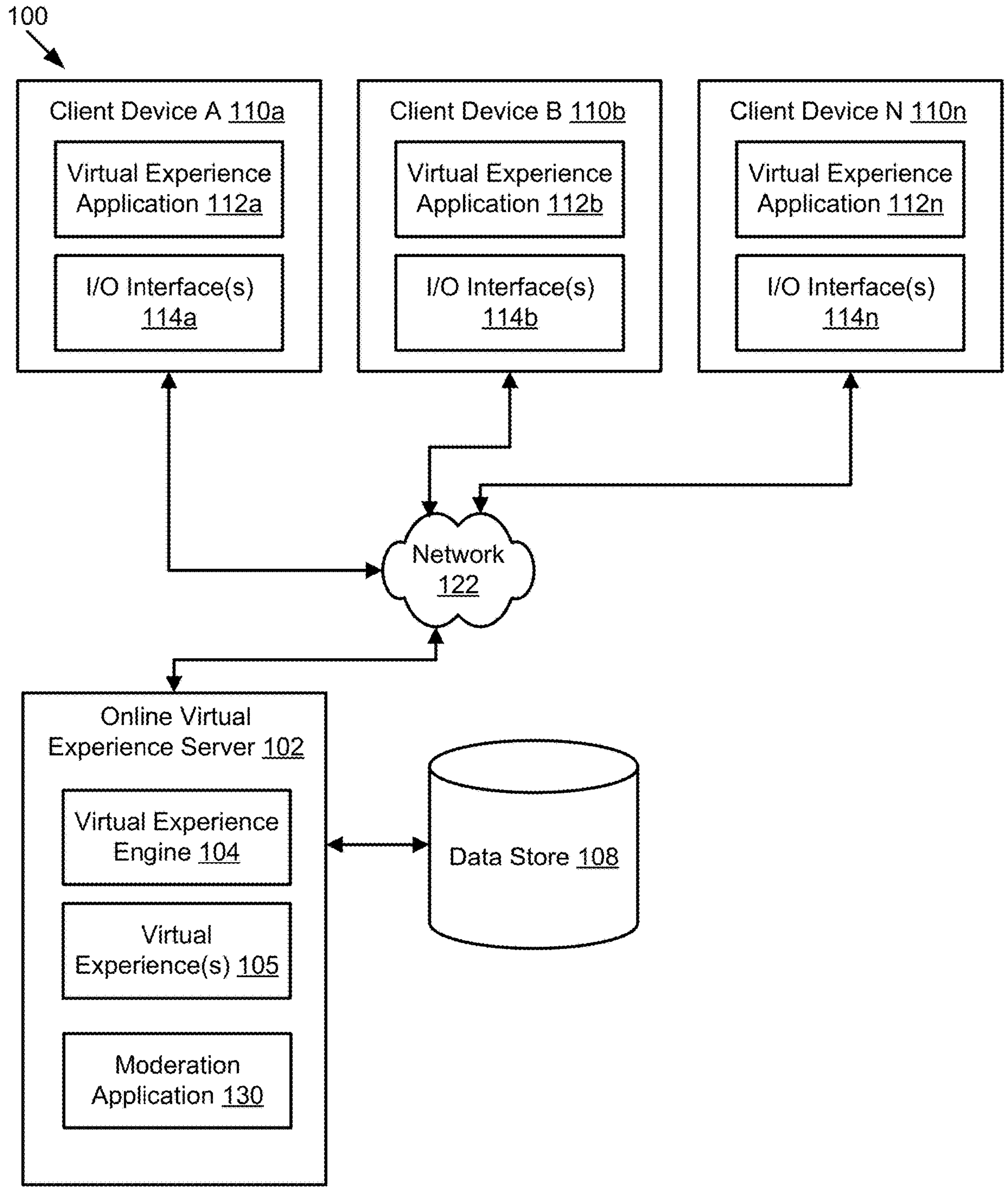
FIG. 1 is a block diagram of an example network environment, according to some embodiments described herein.

When users interact on a virtual environment platform, a first user may commit several types of abuse. Abuse in a voice chat was previously difficult to detect in real-time because of the inherent delay present in waiting for a moderator to review the audio stream (e.g., after a user report of abuse) and make a determination about whether the audio stream included abuse.

Audio machine-learning models that work in real-time have been difficult to implement because if the audio machine-learning model outputs too many false positives (i.e., identifies too many instances of abuse that are not actually abuse), then it annoys users and may discourage them from interacting in a virtual experience. If the audio machine-learning model outputs too many false negatives (i.e., fails to identify instances of abuse), it may make the virtual experience unsafe because too many users are likely to be exposed to abuse. In addition, the audio machine-learning model may suffer from lack of diversity in training data in instances where certain types of labeled training data (e.g., audio that is associated with the racism label) are insufficient for creating a robust audio machine-learning model with sufficient precision/recall.

The disclosure advantageously describes a metaverse application that uses an audio machine-learning model to identify abuse in real-time in audio streams in a virtual environment. The audio machine-learning model has high precision (correctly classifies abuse and non-abusive audio) with good recall (detects a majority of abusive audio). The audio machine-learning model has a small size (e.g., memory requirements) and is computationally efficient.

In some embodiments, the audio machine-learning model is trained by using a first segment classifier that identifies whether an audio stream is toxic or non-toxic in real time based on the semantic nature of the segment. The training may also include using a keyword classifier that identifies whether each word is toxic or non-toxic and aligning the results from the first segment classifier and the keyword classifier for improved recognition of toxicity. The training may also include a second segment classifier that takes longer to process the audio stream but is more accurate in identifying toxicity in audio streams.

In some embodiments, the audio machine-learning model is trained using synthetic data that includes labels paired with toxic labels. In some embodiments, the audio machine-learning model is trained using synthetic audio that is generated by providing transcribed audio from voice chat to a large language model with a prompt requesting new text with particular characteristics. The new text is combined with original speaker characteristics to create synthetic audio. The synthetic audio may be used to provide greater diversity in training data by serving as a source of training data for categories of audio with smaller data sets and/or for categories of audio where labelling is more difficult because a greater amount of data is needed to determine a context of the audio.

Once the audio machine-learning model is trained, it is used for real-time content moderation. A method may include receiving a user-provided audio stream associated with a user. For example, the user may be a player in a virtual environment. The user-provided audio stream is divided into a plurality of portions, where each portion corresponds to a particular time window of the audio stream, such as every 15 seconds, every time a user takes a pause, etc. The plurality of portions of the user-provided audio stream are provided as input to the audio machine-learning model, which outputs a determination of abuse. A remedial action is performed responsive to the determination of abuse in the particular portion of the user-provided audio stream. For example, a first offense may include a warning, a subsequent offense may include muting the user's microphone, and a more serious offense may include banning the user from participating in the virtual environment for a period of time.

Example Network Environment

FIG. 1 illustrates an example network environment 100, in accordance with some implementations of the disclosure. FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The network environment 100 (also referred to as a "platform" herein) includes an online virtual experience server 102, a data store 108, and a client device 110 (or multiple client devices), all connected via a network 122.

The online virtual experience server 102 can include, among other things, a virtual experience engine 104, one or more virtual experiences 105, and a moderation application 130. The online virtual experience server 102 may be configured to provide virtual experiences 105 to one or more client devices 110, and to moderate audio streams via the moderation application 130, in some implementations.

Data store 108 is shown coupled to online virtual experience server 102 but in some implementations, can also be provided as part of the online virtual experience server 102. The data store may, in some implementations, be configured to store advertising data, user data, engagement data, and/or other contextual data in association with the moderation application 130.

The client devices 110 (e.g., 110*a*, 110*b*, 110*n*) can include a virtual experience application 112 (e.g., 112*a*, 112*b*, 112*n*) and an I/O interface 114 (e.g., 114*a*, 114*b*, 114*n*), to interact with the online virtual experience server 102, and to view, for example, graphical user interfaces (GUI) through a computer monitor or display (not illustrated). In some implementations, the client devices 110 may be configured to execute and display virtual experiences, which may include virtual user engagement portal s as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., user 114 via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "client device 110." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience or another GUI of the online platform 100, a user may create an avatar that includes different body parts from different libraries. The moderation application 130 may take as input audio streams from users participating in the virtual experience and identify instances of toxicity in the audio stream. The moderation application 103 may perform a remedial action in response to identifying instances of toxicity, such as warning the user about abusive actions and mute the user's audio.

Example Computing Device

Figure 2:
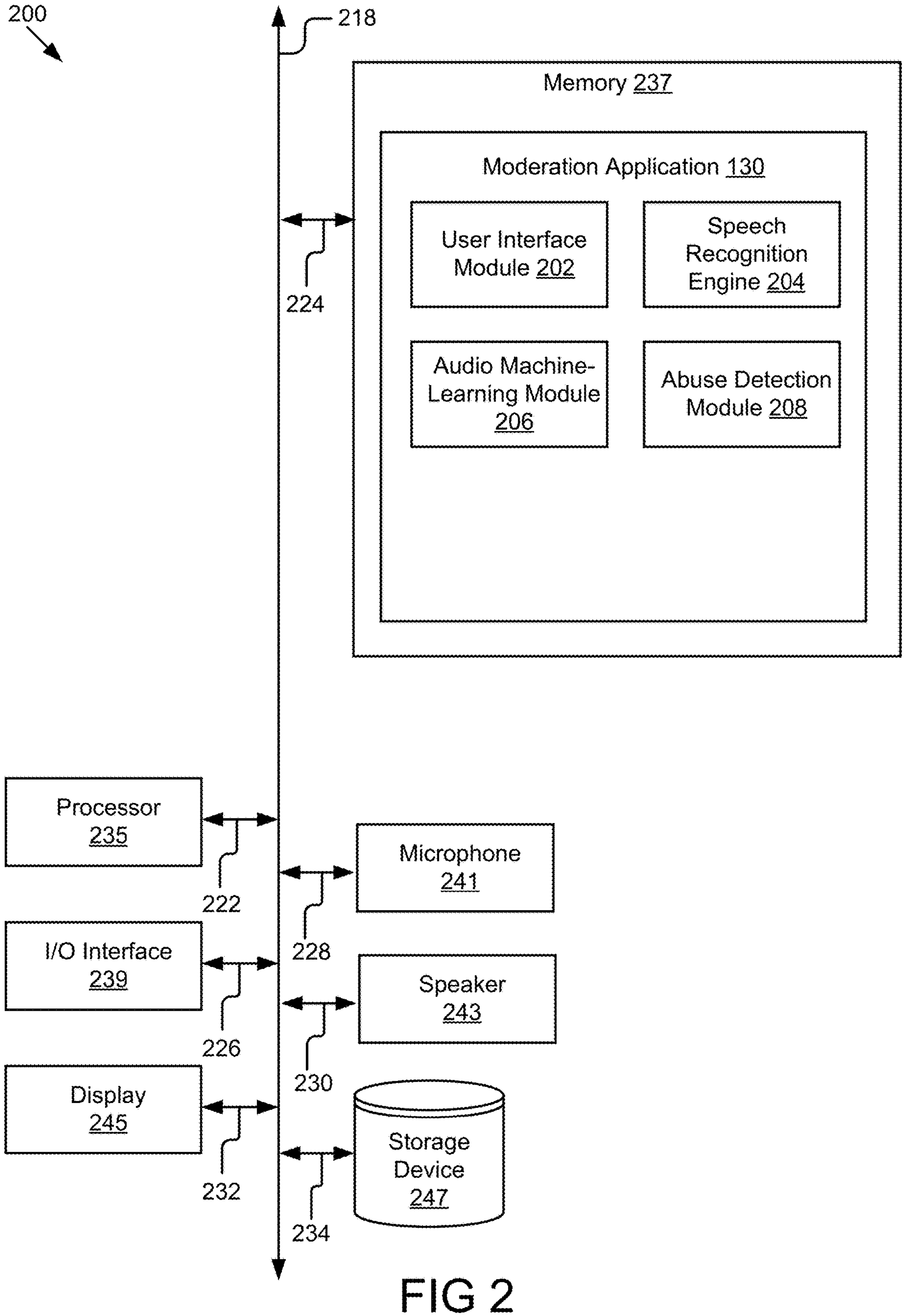
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, the computing device 200 is the client device 110. In some embodiments, the computing device 200 is the online virtual experience server 102.

In some embodiments, computing device 200 includes a processor 235, a memory 237, an Input/Output (I/O) interface 239, a microphone 241, a speaker 243, a display 245, and a storage device 247, all coupled via a bus 218. In some embodiments, the computing device 200 includes additional components not illustrated in FIG. 2. In some embodiments, the computing device 200 includes fewer components than are illustrated in FIG. 2. For example, in instances where the moderation application 130 is stored on the online virtual experience server 102 in FIG. 1, the computing device may not include a microphone 241, a speaker 243, or a display 245.

The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the display 245 may be coupled to the bus 218 via signal line 232, and the storage device 247 may be coupled to the bus 218 via signal line 234.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. In some implementations, the processor 235 may include special-purpose units, e.g., machine learning processor, audio/video encoding and decoding processor, etc. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200, such as a keyboard, mouse, etc.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD ROM) device, a DVD ROM device, a DVD RAM device, a DVD RW device, a flash memory device, or some other mass storage device for storing information on a more permanent basis. The memory 237 includes code and routines operable to execute the moderation application 130, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 247), and input/output devices can communicate via I/O interface 239. In another example, the I/O interface 239 can receive data from the online virtual experience server 102 and deliver the data to the moderation application 130 and components of the moderation application 130, such as the user interface module 202. In some embodiments, the I/O interface 239 can connect to interface devices such as input devices (keyboard, pointing device, touchscreen, microphone 241, sensors, etc.) and/or output devices (display 245, speaker 243, etc.).

Some examples of interfaced devices that can connect to I/O interface 239 can include a display 245 that can be used to display content, e.g., images, video, and/or a user interface of the metaverse as described herein, and to receive touch (or gesture) input from a user. Display 245 can include any suitable display device such as a liquid crystal display (LCD), light emitting diode (LED), or plasma display screen, cathode ray tube (CRT), television, monitor, touchscreen, three-dimensional display screen, a projector (e.g., a 3D projector), or other visual display device.

The microphone 241 includes hardware, e.g., one or more microphones that detect audio spoken by a person. The microphone 241 may transmit the audio to the moderation application 130 via the I/O interface 239.

The speaker 243 includes hardware for generating audio for playback. In some embodiments, the speaker 243 may include audio hardware that supports playback via an external, separate speaker (e.g., wired or wireless headphones, external speakers, or other audio playback device) that is coupled to the computing device 200.

The storage device 247 stores data related to the moderation application 130. For example, the storage device 247 may store a user profile associated with a user 125, a list of blocked avatars, etc.

Example Moderation Application

FIG. 2 illustrates a computing device 200 that executes an example moderation application 130 that includes a user interface module 202, a speech recognition engine 204, an audio machine-learning module 206, and an abuse detection module 208. In some embodiments, a single computing device 200 includes all the components illustrated in FIG. 2. In some embodiments, one or more of the components may be on different computing devices 200. For example, the client device 110 may include the user interface module 202, while the abuse detection module 208 is implemented on the online virtual experience server 102. In some embodiments, different portions of one or more of modules 202, 204, 206, and 208 may be implemented on the client device 110 or on the online virtual experience server 102. In some embodiments, the modules 202, 204, 206, and 208 may be used during training of the machine-learning model for abuse detection and modules 202 and 208 are used during inference (i.e., while the moderation application 130 performs abuse detection).

The user interface module 202 generates graphical data for displaying a user interface for users associated with client devices 110 to participate in a virtual experience. In some embodiments, before a user participates in the virtual experience, the user interface module 202 generates a user interface that includes information about how the user's information may be collected, stored, and/or analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

The user interface module 202 receives user input from a user during gameplay of a virtual experience. For example, the user input may cause an avatar to move around, perform actions, change poses, speak to other users (via audio chat), etc. in the virtual experience. The user interface module 202 generates graphical data for displaying the location, actions, poses, etc. of the avatar within the virtual experience.

The user may interact with other users in the virtual experience. Some of these interactions may be negative and, in some embodiments, the user interface module 202 generates graphical data for a user interface that enables a user to limit exposure to other users that the user wants to avoid. For example, the user interface module 202 may include an option to mute other users, block other users, and to report abuse that occurs in the virtual experience. For example, another avatar may be wearing an objectionable piece of clothing, an avatar may be holding an inappropriate object (e.g., a flag associated with a hate group, an object in the shape of something offensive, etc.), an avatar may perform an offensive action (e.g., the avatar may use spray paint to draw an image of genitals), or an avatar may utter an inappropriate statement (e.g., either in a chat box or directly via voice chat to the user). One avatar may also be associated with multiple types of abuse, such as wearing inappropriate clothing while performing an offensive act.

As is described in greater detail below, the abuse detection module 208 determines that a user committed abuse and performs a remedial act in response to determining that the user committed abuse. In some embodiments, the remedial act includes providing a warning to the user. The abuse detection module 208 may instruct the user interface module 202 to generate graphical data for displaying a warning. In some embodiments, the remedial act includes muting a microphone on the client device associated with the user. In some embodiments, instead of muting the microphone on the client device, the abuse detection module 208 suppresses the user-provided audio stream from being delivered to one or more other users. The abuse detection module 208 instructs the user interface module 202 to generate graphical data to explain to the user that their microphone has been muted, how long the microphone is muted for, how additional violations will result in more extreme consequences, etc.

The speech recognition engine 204 receives an audio stream. The audio streams that are used to generate training data for the audio machine-learning model are used responsive to obtaining user consent. The user consent is obtained from a user legally and regulation-wise qualified to grant permission (e.g., a parent for a user below certain ages, the user themselves for certain ages, etc.). The user-identifiable information is removed from the audio streams. The audio streams are collected using security communications are not stored once training of the audio machine-learning model is complete. In some embodiments, only instances of user-provided audio that include examples of abuse are used for training purposes. All applicable laws and regulations are followed regarding user-provided audio.

In some embodiments, the speech recognition engine 204 performs preprocessing of audio streams by applying different filters to the audio stream. In some embodiments, the speech recognition engine 204 includes a voice activity detection (VAD) model that confirms that human speech was detected in the audio stream. The VAD model advantageously reduces instances where content moderation is performed on audio streams that do not include human speech. As a result, the content moderation process is computationally more efficient (by eliminating non-human speech parts of audio) and faster. For example, the queries for inference to an abuse detection machine-learning model to determine whether a particular portion of audio includes abusive content may be reduced substantially by excluding non-human speech audio, e.g., the query volume may be reduced by 10% in some cases.

In some embodiments, the speech recognition engine 204 applies a filter that removes background noise from the audio stream. As a result, the human speech in the audio stream is easier to detect.

The speech recognition engine 204 (e.g., an automatic speech recognition (ASR) ASR engine) divides the audio stream into portions. For example, the portions may be of 15 seconds or less, 30 seconds or less, up to 60 seconds, or other lengths. The speech recognition engine 204 divides the portions into segments. In some embodiments, the speech recognition engine 204 divides the segments based on detecting pauses between words, which may correlate to the division between parts of a sentence or between sentences. The speech recognition engine 204 generates a transcription for each portion.

The audio machine-learning module 206 trains an audio machine-learning model to output a determination of abuse. In some embodiments, the audio machine-learning model is trained to detect and classify one or more of offensive keywords, offensive segments, and disruptive noise and emotions.

The audio machine-learning module 206 generates a training data set. In some embodiments, the training data set includes synthetic audio data. The use of synthetic audio data advantageously resolves issues with confusable words (e.g., ship/shit, ask/ass, fudge/fuck, flag/fag, etc.). In some embodiments, the synthetic data includes real-voice data with synthetic labels and synthesized voice from text chats where the text was identified as including instances of toxicity. The real-voice data is only used when users provide consent for the use of their data to train an audio machine learning model. If a user does not provide consent for the user of their data, there is no impact on platform participation.

In some embodiments, the training data set also includes ground truth labeled data, such as when moderators review the real-voice data and assign labels to different portions, e.g., as abusive (optionally, with abuse category) or non-abusive. In some embodiments, the ground truth labels may also be derived from abuse reports where a user complains about another user's behavior. Because the audio machine-learning model generates synthetic training audio data and corresponding labels, limited human resources may be used to apply the labels to the audio submitted with the abuse report, which may then be used as ground truth data to compare to labels generated by the audio machine-learning model and used to train the audio machine-learning model.

Figure 3A:
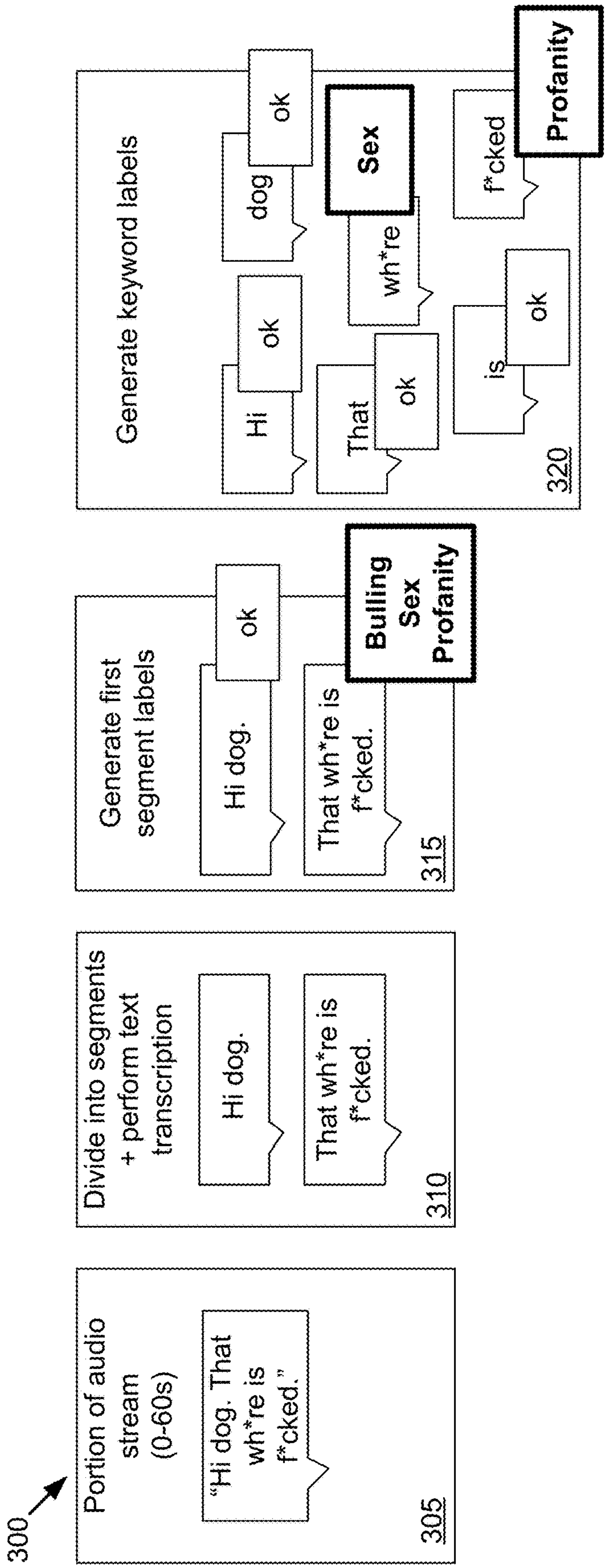
FIGS. 3A-3B are example illustrations of a process for creating labels for training data, according to some embodiments described herein.

Turning to FIGS. 3A, an example 300 of the process for creating labels for training data is illustrated according to some embodiments described herein. A portion of an audio stream is received 305. The portion may be defined temporally (e.g., every 15 seconds), based on breaks in speech, etc.

In this example, the portion of the audio stream is "Hi dog. That wh*re is f*cked" without the asterisks. The speech recognition engine 204 divides the portion of the audio stream into a pair of segments and performs text transcription 310. In some embodiments, the segments are divided based on pauses in the audio stream that may correspond to sentences. In this example, the portion of the audio stream is segmented into "Hi dog." and "That wh*re is f*cked."

In some embodiments, the audio machine-learning model performs keyword-based analysis and segment-based analysis on the segments. Keyword-based analysis uses grammatical rules to identify toxic audio based on analysis discrete words. Keyword-based analysis may miss some instances of toxicity because analyzing discrete words and not the context of the segment means the words have to be objectively toxic regardless of the context. For example, the word "butt" may be used appropriately to refer to a part of the body or inappropriately as an insult. Segment-based analysis identifies words that are toxic based on the context of the entire segment.

The audio machine-learning model uses a first classifier, such as a first segment classifier, to generate a first segment label for each of the pair of segments 315. In this example, "Hi dog." is associated with an okay label and "That wh*re is f*cked." is associated with toxic labels. Specifically, the toxic labels are for bullying, sex, and profanity. The toxic labels for the segments include an additional label of bullying that was not identifiable from the keyword analysis because greater context is present in segment analysis.

Other labels may be possible. For example, the toxic labels may include one or more of bullying and harassment, real-world dangerous activities, discrimination and hate, extortion and blackmail, sexual content, violent content and gore, threats of violence, illegal and regulated, dating and romance, profanity, spam, political content, misleading impersonation or misrepresentation, disruptive audio, cheating and exploits, etc.

The segment labels may not catch all the toxicity. In some embodiments, the audio machine-learning module 206 may generate a keyword label to each of the pair of segments 320 to identify toxicity that the segment labels have missed. In this example, "Hi," "dog," "That," and "is" are associated with okay labels; "wh*re" is associated is associated with the toxic label for sex; and "f*cked" is associated with the toxic label for profanity. The pairs of segments, segment labels, and keyword labels are added to a training data set.

Figure 3B:
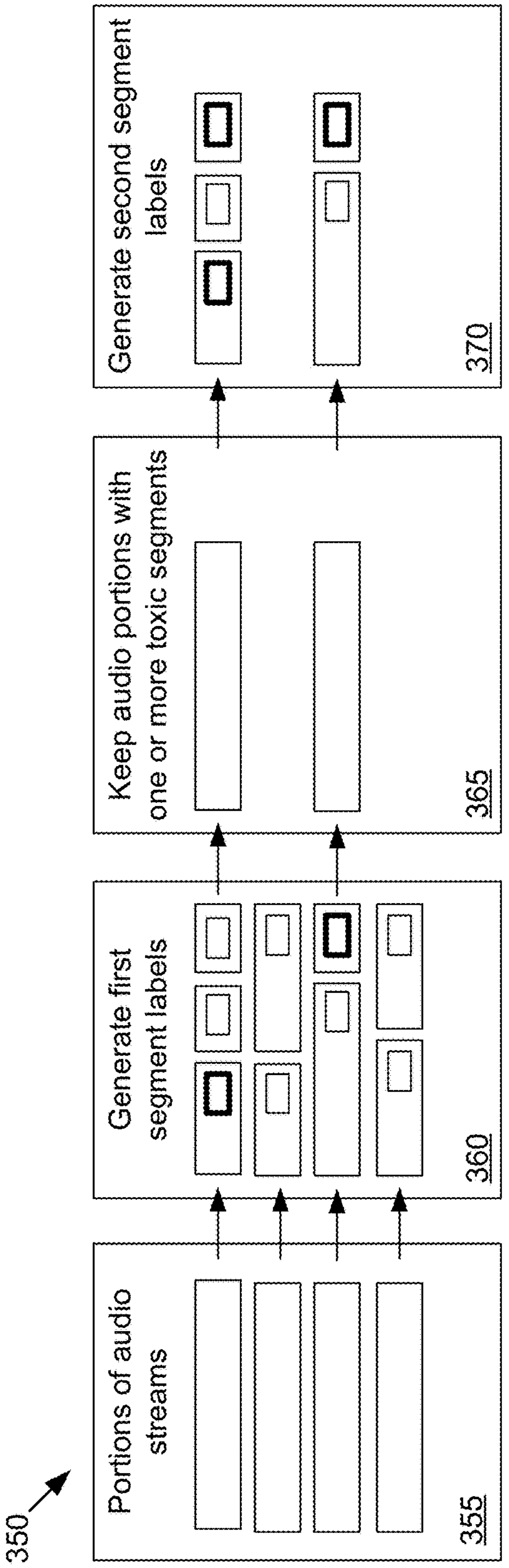

Turning to FIGS. 3B, another example 350 of the process for creating labels for portions of audio is illustrated. Portions of audio streams are received 355. The audio machine-learning module 206 uses a first classifier to generate first segment labels 360. The toxic labels in this step are the bolded blocks. The audio machine-learning module 206 keeps audio portions with one or more toxic segments 365. The audio machine-learning module 306 uses a second classifier, such as a second segment-level classifier, to generate second segment labels 370.

The second classifier may be more accurate at identifying instances of abuse than the second segment labels, but the second classifier may require more time (e.g., due to more complex detection techniques requiring computational resources) to process the inputs and the outputs are computationally expensive to generate. For example, the first portion of an audio stream was identified as having only one toxic segment by the first classifier in 360, but the more accurate second classifier identified that the first portion of the audio stream includes two toxic segments in 370. The pairs of segments and second segment labels are added to a training data set.

In some embodiments, training data used for the audio-classifier model includes audio streams collected with user permission for training purposes and labeled by human reviewers (e.g., moderators). For example, the human reviewers listen to audio streams in the training data and identify whether each audio stream includes abuse and if so, timestamps locations within the audio stream where the abuse occurs. The human-generated data is referred to as ground truth labels. Such training data is then used to train the audio-classifier model, e.g., the audio-classifier model under training generates labels for each audio stream in the training data which is compared to the ground truth labels and a feedback function based on the comparison is used to update one or more model parameters. In some embodiments, the human reviewers review audio streams that were submitted as part of an abuse report provided by users. The human review is performed securely and confidentially, and the reviewers are permitted to access the audio streams specifically for the purposes of review and moderation. No user identities are revealed to reviewers.

The audio machine-learning model is trained to receive a portion of an audio stream as input. In some embodiments the audio-classifier model is iteratively applied to the audio stream, where each iteration corresponds to a respective portion of the audio stream, such as every ten seconds, 30 seconds, a minute, etc. as additional audio is received.

Figure 3C:
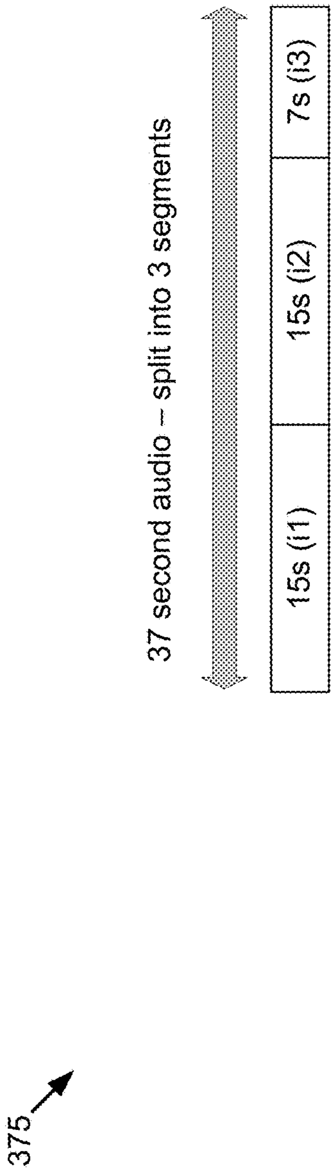
FIG. 3C is an example illustration of how portions of audio are divided by a machine-learning model, according to some embodiments described herein.

Turning to FIG. 3C, a third example 375 illustrates how an audio stream may be divided by the audio machine-learning module 206. The non-overlapping portions of audio (i.e., speech chunks) are analyzed by the audio machine-learning model that was trained with a data set of segments that includes labels for different types of audio. In this example, a 37 second portion of an audio stream is split into three audio portions: a 15 second portion (i1), a 15 second portion (i2), and a seven second portion (i3). The maximum model output is compared to the three segments outputs across the windows (i1, i2, i3, etc.). As a result, the audio stream is analyzed in segments instead of the entire stream at once.

Figure 4:
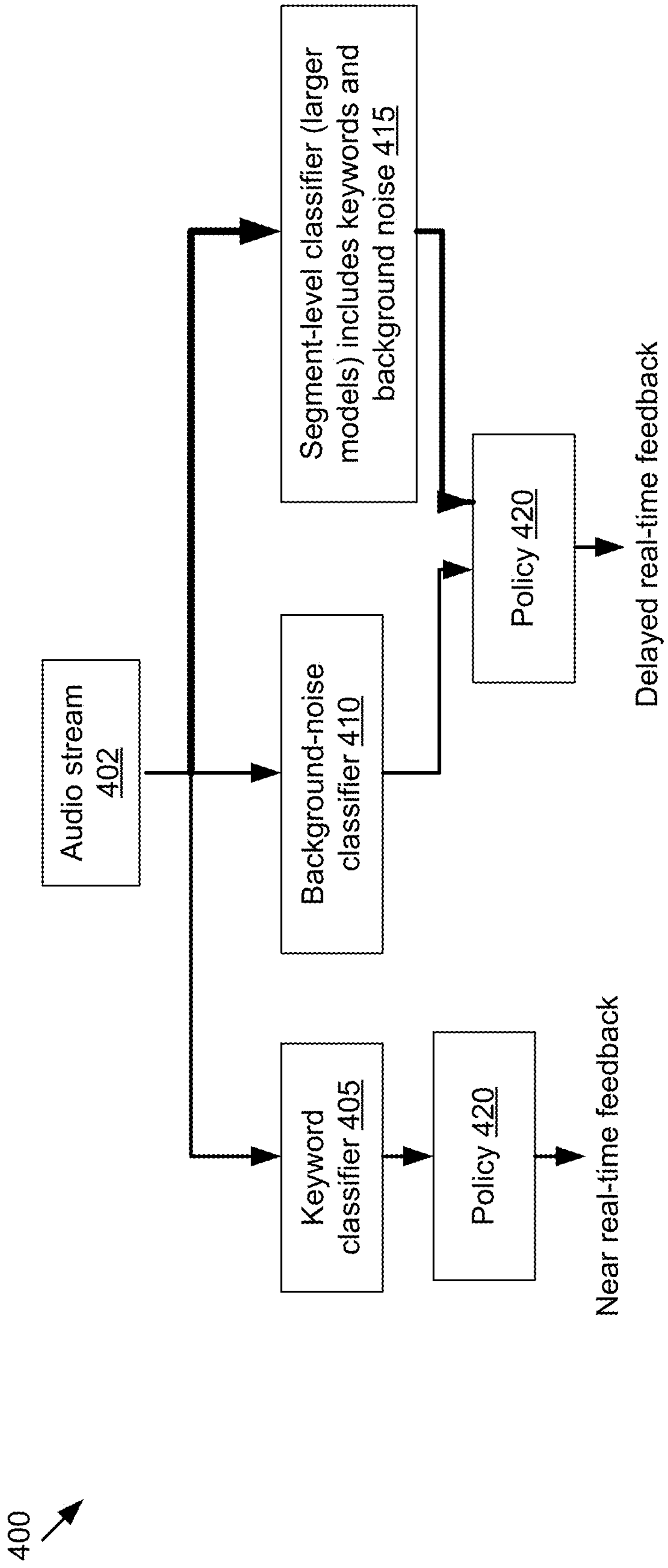
FIG. 4 is a block diagram of an example of a keyword classifier, a background-noise classifier, and a segment-level classifier, according to some embodiments described herein.

In some embodiments, the audio machine-learning model includes multiple classifiers. Turning to FIG. 4, an example block diagram of an architecture 400 that includes a keyword classifier 405, a background-noise classifier 410, and a segment-level classifier 415 are illustrated. The audio stream 402 is received by the keyword classifier 405, the background-noise classifier 410, and the segment-level classifier 415. The keyword classifier 405 outputs labels for the keywords, which are compared to the policy 420 and toxic words are identified based on the policy 420. The feedback is provided in real-time (e.g., 0.5 seconds, one second, etc.). The goal of real-time feedback is to prevent toxic behavior before it happens.

The background-noise classifier 410 outputs identification of background noise as problematic, where the background noise may be distracting, toxic, etc. The background noise may include sound effects as well as spoken words. The output of the background-noise classifier 410 is compared to the policy 420. The feedback is provided in near real-time (e.g., five seconds, seven seconds, etc.). The goal of near real-time feedback is to proactively detect toxic behavior and moderate the audio proactively, e.g., without receiving an abuse report from a user or other user action indicating likely abuse.

In some embodiments, the segment-level classifier 415 is a larger model than the keyword classifier 405 that processes one or more segments in sentences and includes analysis of keywords and background noise. In some embodiments, the segment-level classifier 415 combines information from the other classifiers to augment analysis. The output is compared to the policy 420 and the feedback is also provided in delayed real-time. In some embodiments, each classifier is stored on a separate server.

In some embodiments, the segment-level classifier 415 includes a deep neural network, such as a convolutional neural network. A deep neural network uses multiple layers to progressively extract higher-level features from the raw input where the input to the layers are different types of features extracted from other modules and the output is a determination of whether the audio stream includes abuse or not.

The toxicity categories may include profanity, bullying, dating and sexting, racism, and other where other is an amalgam of categories with smaller amounts of training data, such as grooming, drugs and alcohol, self-harm, and radicalization. In some embodiments, the audio machine-learning model generates synthetic audio that is used as training data. The synthetic audio may be used to generate training data for some of the toxicity categories to address the lack of examples of training data. In some embodiments, synthetic audio and no real-voice audio is used to train the audio machine-learning model.

Figure 5:
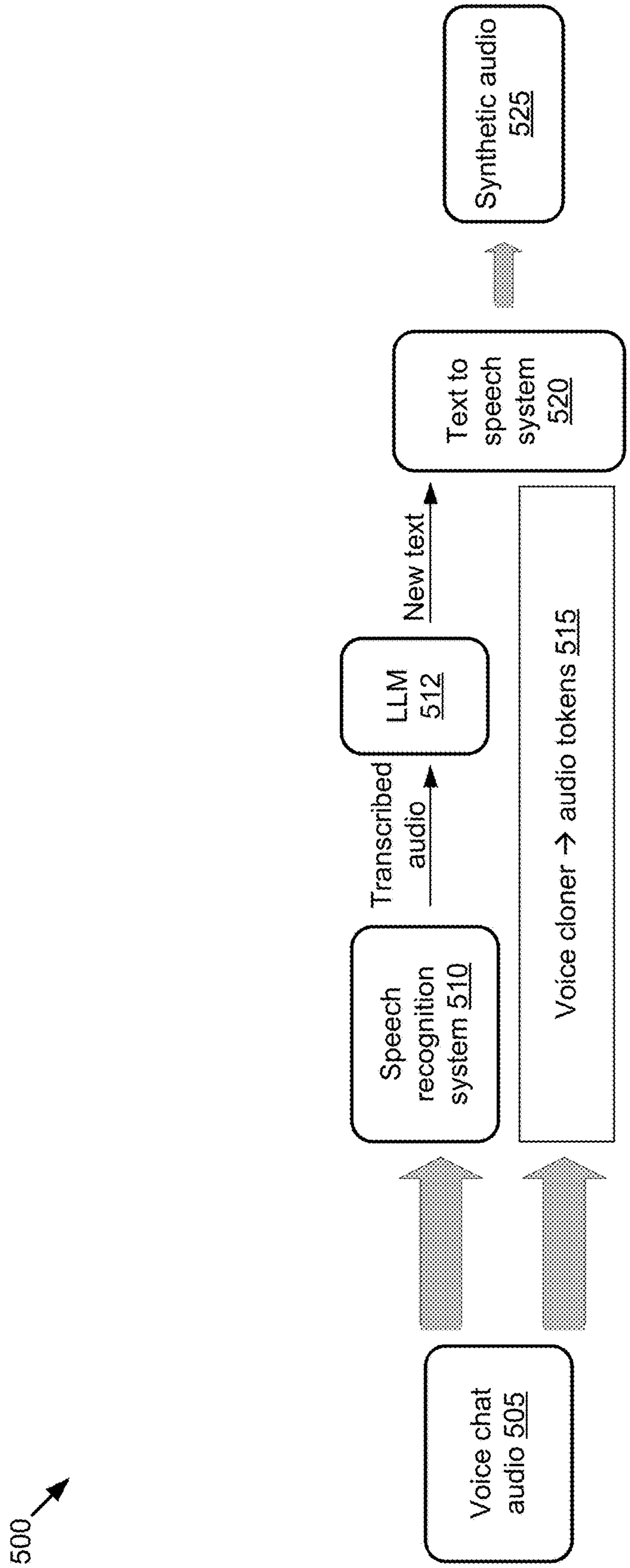
FIG. 5 is an example architecture of an audio machine-learning model that generates synthetic audio, according to some embodiments described herein.

FIG. 5 is an example illustration 500 of how voice chat audio 505 is converted to synthetic audio according to some embodiments. The voice chat audio 505 may include voice chats from various participants in virtual experiences generated by the moderation application 130 illustrated in FIG. 1.

The voice chat audio 505 may be provided to both an automatic speech recognition system 510 and a voice cloner 515. The automatic speech recognition system 510 outputs transcribed audio and provides the transcribed audio as input to a large language model (LLM) 512 along with a prompt specifying new text characteristics, such as a variation of the transcribed speech. The LLM 512 outputs new text. For example, the transcribed speech may be an example of racism, such as "Go back to your country" and the LLM 512 outputs a variation of racism based on the transcribed speech.

The LLM may be prompted with "You're given a list of speech moderation categories as below: 'Bullying': speech in which the speaker engages in bullying, stalking, trolling harassment, intimidation of an individual. 'Profanity': speech that contains profanity. 'DatingAndSexting': speech that describes or proposes romantic or sexual activity involving the speaker and others. 'Racist': speech that disparages others who are of different race, ethnicity, or sexual orientation than the speaker. 'NoViolation': speech that is not classified as 'Bullying' or 'Profanity' or 'Racist' or 'DatingAndSexting.'

The instructions may include "Rewrite the example as a single '{target}' sentence, in first-person or second-person voice, using words and phrases a teenager might use. Your answer should be the sentence with no extra remarks."

The voice cloner 515 preserves the speaker characteristics of the original speaker and outputs audio tokens. Both the new text and the audio tokens are provided as input to a text to speech system 520 that outputs synthetic audio 525. The audio tokens are used to preserve the characteristics of the original speaker and guide the text to speech system 520 to synthesize speech in the same voice. Without the audio tokens, the synthetic audio 525 may lack the subtlety of different tones and the audio machine-learning module 206 may only be trained on only the text and not the inflection used to speak the toxic phrases.

In some embodiments, the audio machine-learning model includes multiple machine-learning models. FIG. 6A is an example architecture of an audio machine-learning model 600 that includes multiple machine-learning models according to some embodiments. A feature extractor 602 may include one or more convolutional neural network with a plurality of layers or local feature extraction of audio features. The feature extractor 602 receives an audio stream as a file or waveform. The audio stream is divided into windows 616 of time (e.g., of up to 15 seconds each).

The feature extractor 602 identifies words of interest for toxicity detection from the input. In some embodiments, the feature extractor 602 employs the Mel Frequency Cepstral Coefficients (MFCC) feature extraction technique. In some embodiments, the use of MFCC may reduce computational cost and reduce latency, e.g., provide 40% speedup in during inference, as compared to using the convolutional neural network alone. The feature extractor 602 provides the extracted audio features and the audio to an encoder 605.

The encoder 605 may be a pre-trained convolutional neural network that learns speech prediction and denoises the audio stream in pre-training using self-supervised learning. The speech prediction training may occur through masking where the training data pairs ground truth text of complete sentences with a masked version of the complete sentences where random words are removed, to train the encoder 605 to predict the masked words in the training data.

In some embodiments, the encoder 605 includes convolutional neural network encoders that encode audio and transmit the encoded audio to a multi-label classification model 610 and an audio-to-keyword detection model 615.

The multi-label classification model 610 may be a transformer encoder, which identifies the encoded audio as including different types of labels. The transformer encoder includes an attention mechanism that instructs encoding layers to focus on specific parts of the audio input using assigned weights to relevant parts thereby weighing their value. The transformer encoder may include between 12 encoding layers with eight attention heads and 24 encoding layers with 12 attention heads. Other numbers of encoding layers and attention heads may be used.

In some embodiments, the multi-label classification model 610 is trained by determining mask prediction loss based on the target labels. In some embodiments, the multi-label classification model 610 is trained using a connectionist temporal classification (CTC)/minimum word error rate (MWER) loss and/or cross entropy (CE) loss.

The audio-to-keyword detection model 615 categorizes words in the encoded audio for each window 616 as good or toxic. The audio-to-keyword detection model 615 directly operates on the encoded audio by comparing the audio to a predefined list of keywords that are congruent with toxic categories. In some embodiments, the audio-to-keyword detection model 615 is trained using a Connectionist Temporal Classification (CTC) loss.

In some embodiments, the overall loss (known as Multi-Task Learning (MTL) loss) for the multi-label classification model 610 and the audio-to-keyword detection model 615 is defined using the following equation:

$$£_{MTL} = \lambda * £_{CE} + (1 - \lambda) * £_{CTC} \quad \text{Eq. 1}$$

where $£_{MTL}$ is the MTL loss, $\lambda$ is a hyperparameter, $£_{CE}$ is the CE loss, and $£_{CTC}$ is the CTC loss. In some embodiments, the hyperparameter is set to 0.7.

Figure 6B:
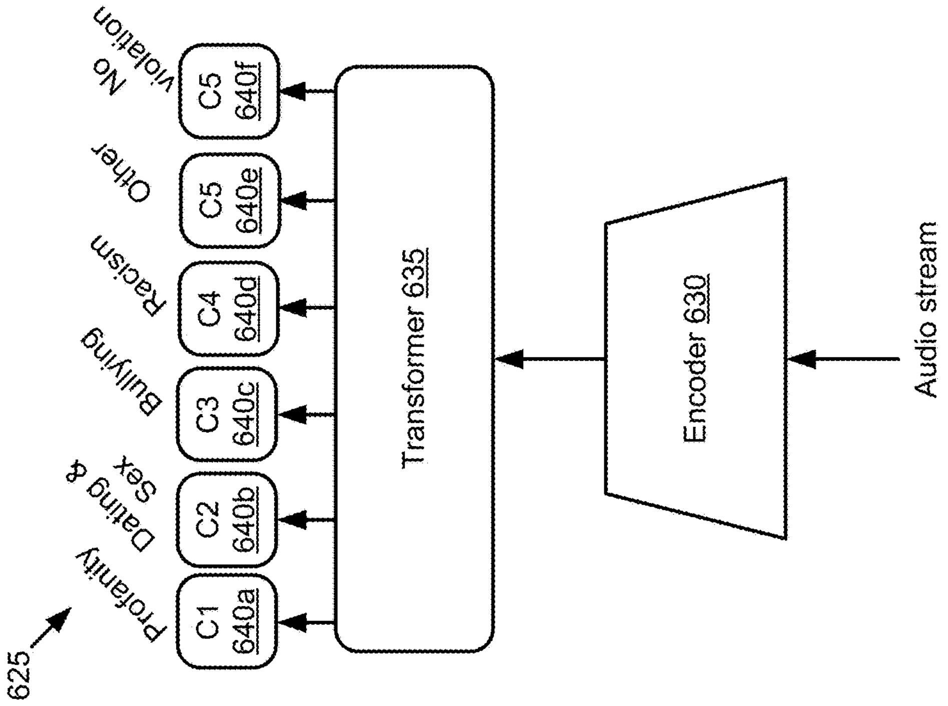
FIGS. 6A-6D are example architectures of an audio machine-learning model that identifies toxicity in audio streams, according to some embodiments described herein.
Figure 6A:
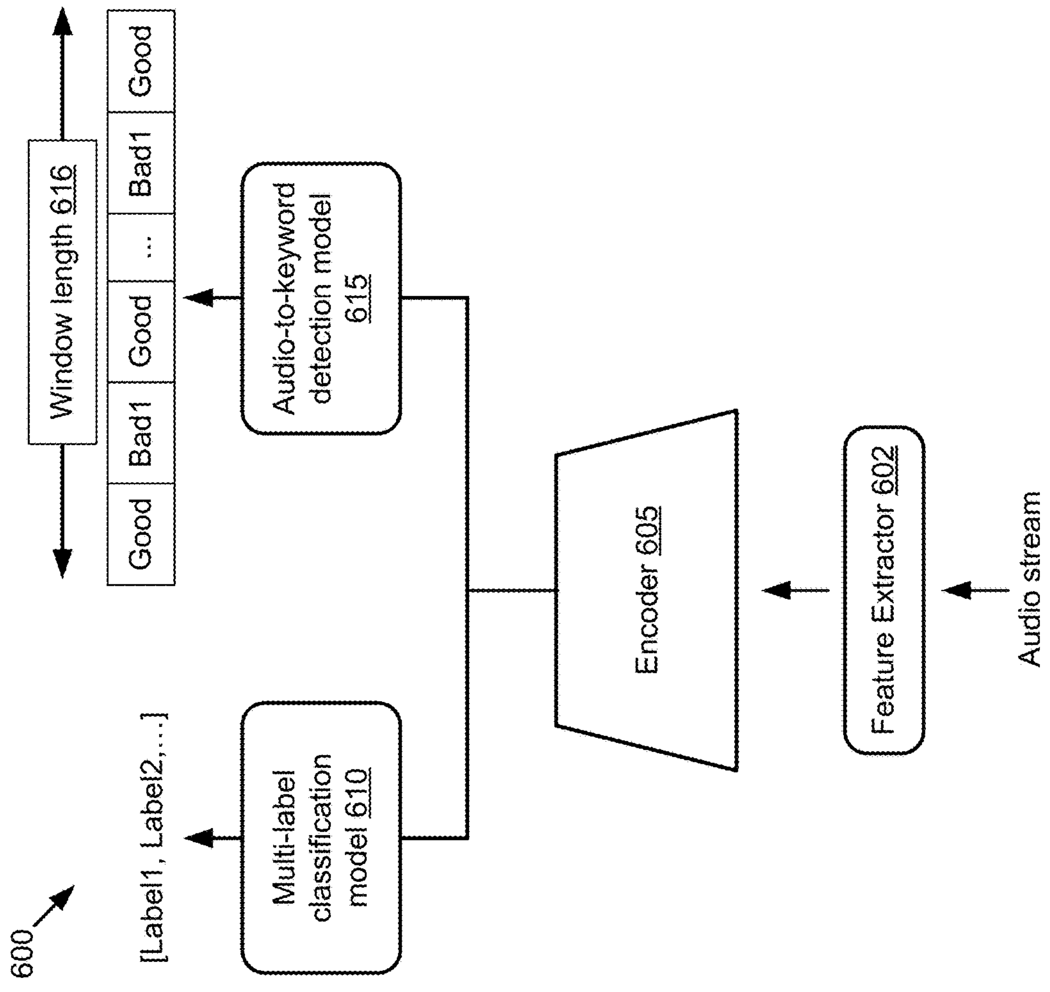

FIG. 6B is another example architecture of an audio machine-learning model 625. In this example, the audio is received by an encoder 630, which outputs encoded audio to a transformer 635 that is trained using cross-entropy loss where the parameters C1-C5 for the cross-entropy loss include profanity 640*a*, dating and sex 640*b*, bullying 640*c*, racism 640*d*, other 640*e*, and no violations 640*f*. The other 640*e* category may encompass a diverse range of toxic speech, including references to grooming, drugs and alcohol, radicalization, and other concepts that do not fit into the initial four toxic categories. The encoder 630 may be trained using training data with labels that correspond to the parameters C1-C5. In various embodiments, fewer or more categories may be used.

A trained audio machine-learning model may be deployed on a virtual environment platform to detect abuse in audio streams, e.g., audio chat between users of the virtual environment platform. The audio machine-leaning model receives portions of an audio stream (audio chat between users) as input. The audio machine-learning model outputs a determination of abuse. The determination of abuse may be associated with an abuse score that reflects a level of abuse (e.g., mildly abusive, somewhat abusive, extremely abusive, etc.) and a confidence score that reflects a confidence in the abuse score.

The abuse detection module 208 performs a remedial action based on a determination of abuse. For example, the first time a determination of abuse occurs, the remedial action may be a warning and the second time a determination of abuse occurs, the remedial action may be a ban, such as muting a microphone on the client device 110 associated with the user that committed the abuse, preventing the audio stream associated with the user from reaching other users, muffling the audio stream, etc. In some embodiments, the abuse detection module 208 determines the remedial action based on the abuse score where abuse scores that exceed a threshold abuse value result in more serious remedial actions. In some embodiments, the determination of abuse is associated with a confidence score and a user's microphone is not muted unless the confidence score meets a threshold confidence value. In some embodiments, other factors are used to determine the remedial action, such as a user's past history.

Figure 6C:
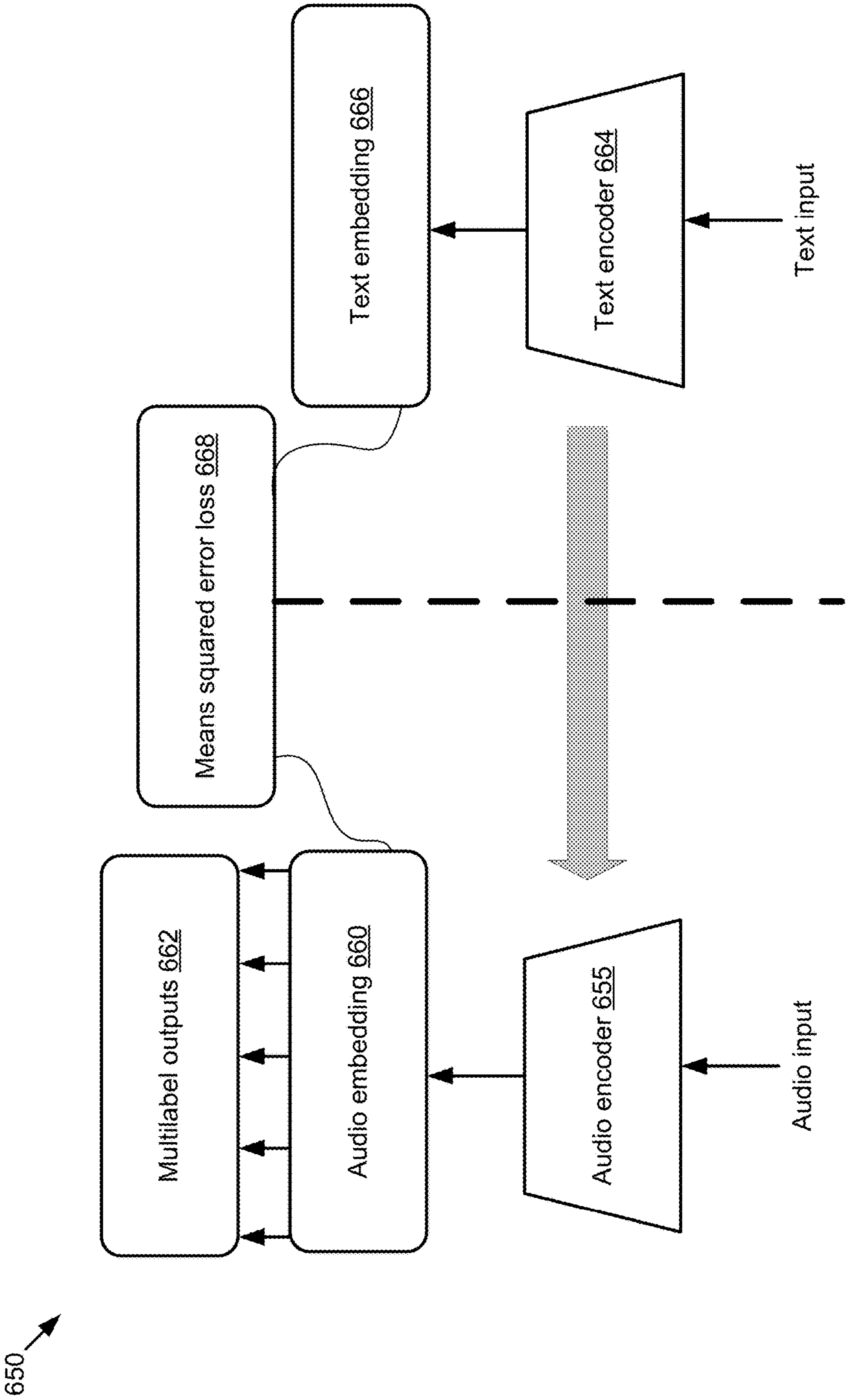

FIG. 6C is an example architecture of a cross-modal audio machine-learning model 650. The audio machine-learning model 650 includes an audio encoder 655 (also referred to as a audio encoder) and a text encoder 664. The audio encoder 655 receives audio input and the text encoder 664 receives text input where the text input is a transcribed version of the audio input. For example, the text input may be received from the audio stream illustrated in FIG. 3A.

The audio encoder 655 encodes the audio and outputs an audio embedding 660. The audio embedding 660 is compared to labelled embedded audio to find the nearest neighbors to the audio embedding 660. Once the nearest neighbors are found, multilabel outputs 662 are determined that correspond to the audio embedding 660, such as profanity, dating and sex, bullying, racism, no violation, or any other labels. The audio embedding 660 is multidimensional in that the comparison advantageously uses tones from the audio input to determine how the words are being used. For example, "what are you doing?" may sound friendly or accusatory depending on the context of the audio and tone used in the audio.

The text system uses a corollary of audio tone meaning as applied to semantic meaning for text. The text encoder 664 encodes the text outputs a text embedding 666 where the text embedding 666 embeds a semantic meaning associated with the text based on, for example, the overall grammar of a sentence. For example, "today is a good day" and "the weather is nice" have similar semantic meanings.

The audio embedding 660 and the text embedding 666 represent similar data (same meaning, expressed in text and in audio) across different modalities. The audio embedding 660 and the text embedding 666 are compared and the difference between them is reflected by a loss function, such as by using a means squared error loss 668. One or more parameters of the audio encoder 655 are adjusted to reduce the value of the loss function.

Figure 6D:
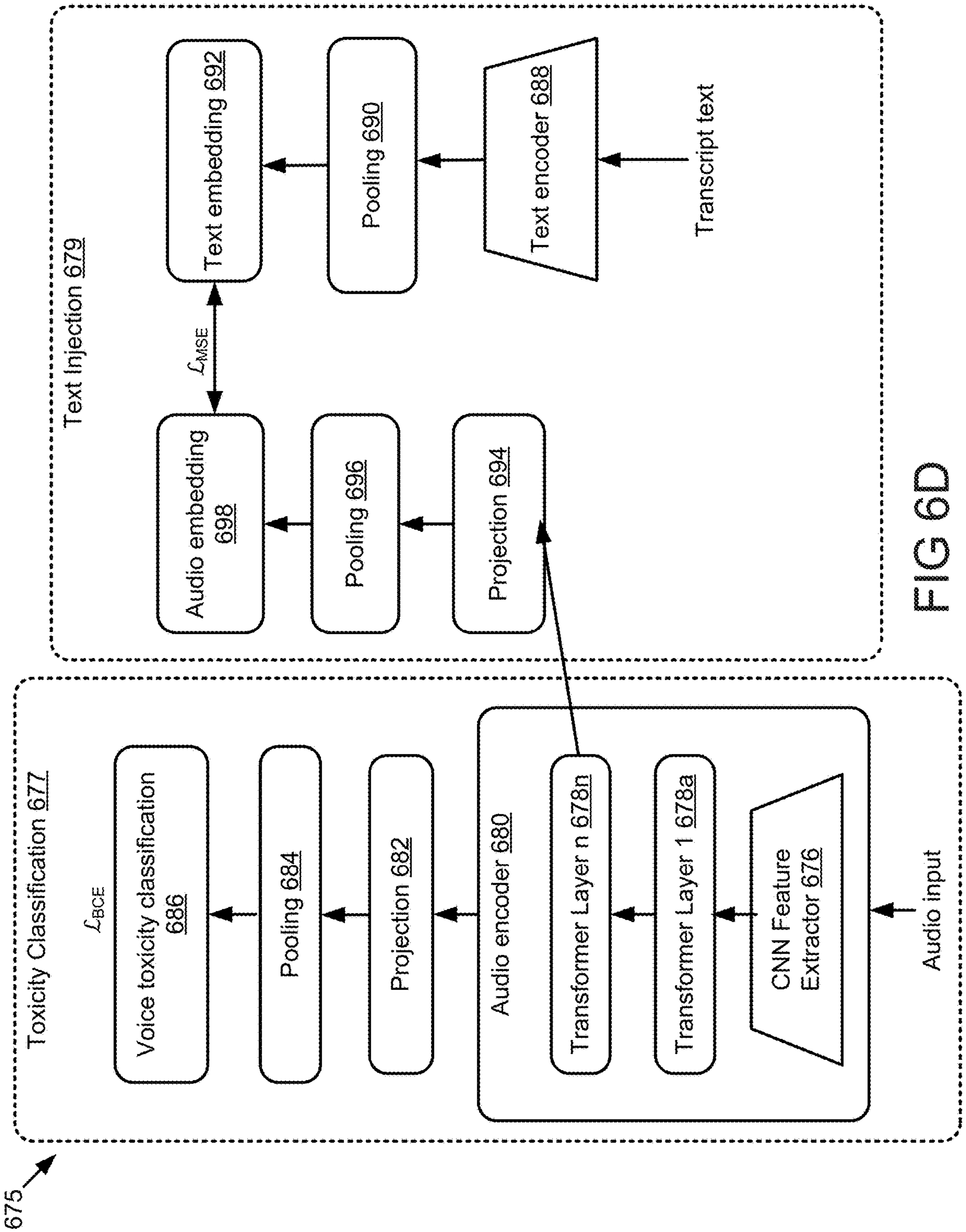

FIG. 6D is another example architecture of a cross-modal audio machine-learning model 675 that includes a toxicity classification portion 677 and a text injection portion 679.

The audio encoder 680 includes a convolutional neural network (CNN) feature extractor 676 and multiple transformer layers 678 (e.g., transformer layer 1 678*a* to transformer layer n 678*n*). The CNN feature extractor 676 extracts audio features from an audio input. The transformer layers 678 iteratively generate audio embeddings, where each audio embedding corresponds to an audio token that mixes information from other input audio tokens via a self-attention mechanism. For example, each word in the audio input may be associated with an audio embedding.

The self-attention mechanism includes multiple attention heads that instruct the transformer layers 678 how to focus on specific parts of the audio input using attention scores and weights to relevant parts thereby weighing their value. In some embodiments, selected transformer layers 678 are quantized to reduce the model size. Quantization works by representing the full precision (32 bits) model weights with less bits. Quantization both reduces model size and improves energy efficiency.

In some embodiments, the self-attention layers apply independent linear transformations to each audio embedding to generate query, key, and value vectors. The transformation layers 678 project the audio embeddings and each projection 682 carries its own set of learnable parameters, which allows the self-attention layers to focus on different semantic aspects of the sequence.

The projection 682 is provided as input for pooling 684. The goal of pooling 684 is to generate a single embedding vector that represents the portion of the audio input received by the audio encoder 680. Pooling 684 combines the discrete audio embeddings to create the single embedding vector. For example, mean pooling averages the audio embeddings to create a single audio embedding. The audio embedding is compared to labelled embedded audio to find the nearest neighbors to the audio embedding. Once the nearest neighbors are found, a voice toxicity classification 686 is determined.

The toxicity classification portion 677 is trained to minimize a loss function using a binary cross entropy loss function ($\mathcal{L}_{BCE}$). In some embodiments, one audio clip may include multiple types of violations. In such cases, the toxicity classification portion 677 may perform multi-label classification, e.g., assign multiple labels that respectively correspond to different types of violations.

The text injection portion 679 is applied at different layers of the network to show that a linear projection of a robust embedding space improves the accuracy of the audio machine-learning model 675.

The text injection portion 679 includes a text encoder 688 that receives transcript text where the transcript text is a transcription of the audio input. The text encoder 688 is trained on diverse text content to produce rich semantic text embeddings that correspond to text tokens. The text embeddings of a transcript of audio is a useful representation that is a potential candidate to be injected into the toxicity classification 677 training process to augment the audio encoder's 680 semantic understanding of speech. The text embeddings are pooled 690 and a single text embedding 692 is output.

The transformation layers 678 project the audio embeddings and each projection 694 carries its own set of learnable parameters and uses pooling 696 to aggregate the audio embeddings into a single audio embedding 698. The audio embedding 698 should be similar to the text embedding 692 because both are based on the same input. The text embedding 692 is a useful representation that is used during training of the toxicity classification 677 to augment the audio encoder's 680 semantic understanding of the speech. The toxicity classification 677 is trained by comparing the audio embedding 698 to the text embedding 692 to determine a loss function value. The parameters of the audio machine-learning model are revised to reduce the value of the loss function.

In some embodiments, the text injection portion 679 is formulated as a linear combination of two losses: a classifier loss ($\mathcal{L}_{classifier}$) and a text injection loss value ($\mathcal{L}_{text}$) with hyperparameter α. In some embodiments, a higher hyperparameter (e.g., from 0.1 to 0.9) performs best). The classifier loss is computed on the predictions of the toxicity classification 477, while the text injection loss forces alignment of the output of the text encoder to the 480. The combined loss ($\mathcal{L}$ combined) is defined as:

$$\mathcal{L}\text{ combined} = \alpha\mathcal{L}\text{ classifier} + (1-\alpha)\mathcal{L}\text{ text} \quad \text{Eq. 2}$$

In some embodiments, binary cross entropy loss is used for the $\mathcal{L}$ classifier since it is advantageous for multilabel formulation.

In some embodiments, a mean squared error (MSE) loss and a multi-class N-pair contrastive loss are calculated. The MSE loss may be applied to cross-modal encoders. Multi-class N-pair contrastive loss may be applied to cross-modal training of speech and text machine translation. The losses may be applied at one of the transformer layers 678 in the audio encoder 680. Where a targeted audio encoder layer i is function $\ell i$, the speech s and the corresponding transcript of the audio t, the two variables for the losses are as follows:

$$x = MeanPool(hProj(\ell i(s))) \quad \text{Eq. 3}$$

$$y = MeanPool(t) \quad \text{Eq. 4}$$

where hProj is the learnable projection layer applied to the audio encoder layer outputs to align mismatched dimension sizes between the layer outputs and the text encoder 488 outputs. The mean squared error for text injection loss is calculated as:

$$\mathcal{L}_{MSE} = \|x - y\|2 \quad \text{Eq. 5}$$

Contrastive loss is calculated for each speech segment s and their corresponding transcript y in training batches of N examples, where a set of N−1 transcripts are picked $$\mathcal{L}\text{ constrastive} = -\sum_{s,t} \log \frac{\exp(sim(x, y)/\tau)}{\sum_{t_j \in \mathcal{A}} \exp(sim(x, y(t_j))/\tau} \quad \text{Eq. 6}$$

where $$\mathcal{A} = t \cup \{t_i^-\}_{i=1}^{N-1}$$

is the set of all transcripts in a given training batch, t is a temperature hyperparameter, and sim is the cosine similarity function $$sim(a, b) = \frac{a^T b}{\|a\|\|b\|}.$$

In some embodiments, the contrastive loss works best at classifying audio as toxic, particularly for dating and sex, and racist and bullying categories.

The audio machine-learning model may be trained to predict toxicity in multiple languages. In some embodiments, the toxicity classification 677 and the text injection 679 are trained for multiple languages by training both the toxicity classification 677 and the text injection 679 on a same language, then training both the toxicity classification 677 and the text injection 679 on a same additional language, etc. until the audio machine-learning model is trained for all the specified languages.

Example Architecture

Figure 7:
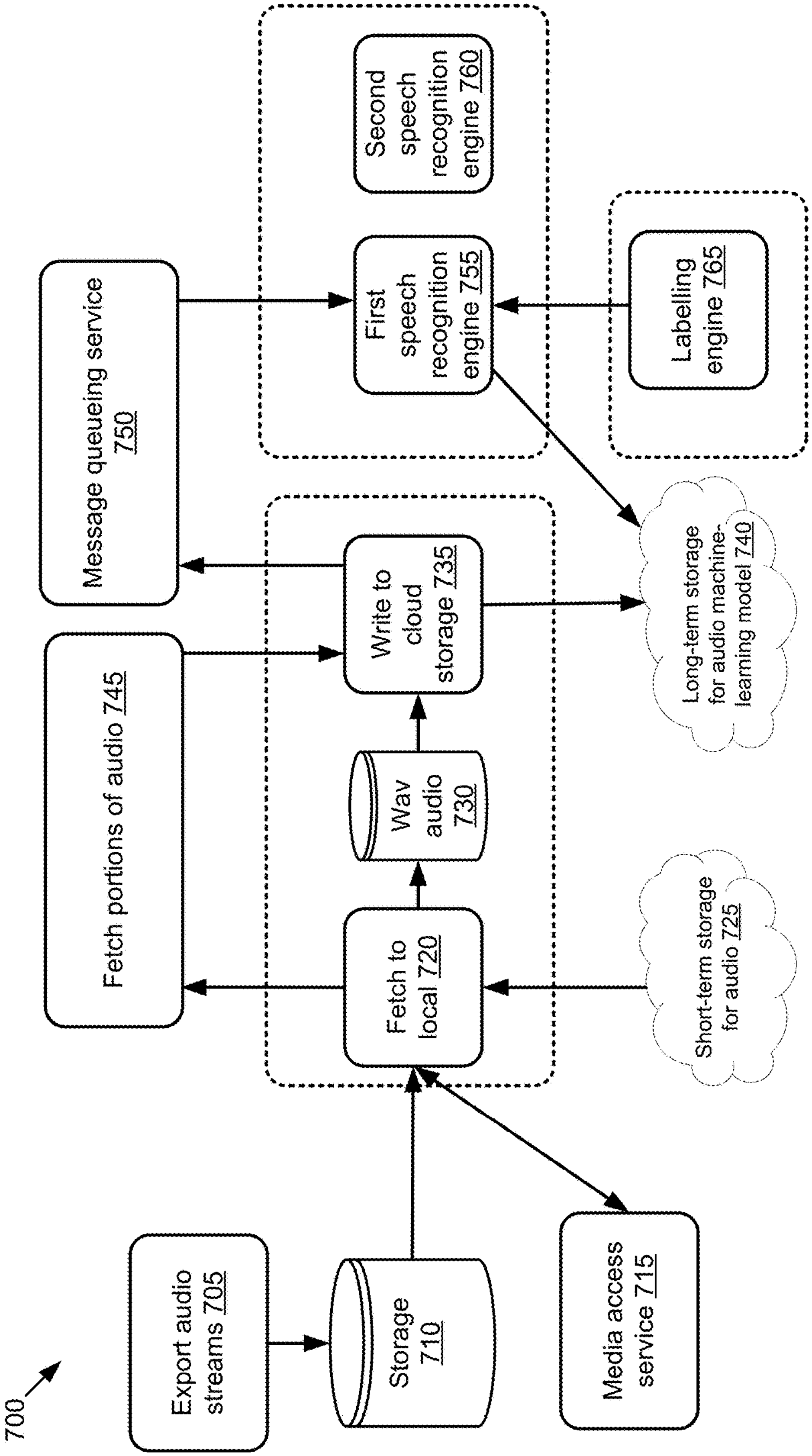
FIG. 7 is an example architecture of an audio machine-learning system that identifies toxicity in an audio stream, according to some embodiments described herein.

FIG. 7 is an example architecture 700 for using an audio machine-learning model on potions of an audio stream to moderate the audio stream (e.g., detect abusive content). Portions of audio streams are exported 705 to storage 710 and the voice metadata is fetched to local 720. The fetch to local 720 receives manifest and audio access from the media access service 715. The fetch to local 720 also receives open encoded audio from short-term cloud storage 725.

The fetch to local 720 uses a message queuing service to fetch portions of audio 745 that are written to cloud storage 735. In addition, the information that was locally fetched includes audio stored in WAV form 730 and written 735 to cloud storage. In instances where the information includes audio from users, the audio is collected only in response to receiving user consent, the audio is stored temporarily for training purposes, and is removed once training is completed. The long-term cloud storage 740 stores the audio machine-learning model, audio embeddings, textual embeddings, etc.

Portions of audio are transmitted to the first speech recognition engine 755 by a message queuing service 750. The first speech recognition engine 755 performs speech recognition and the second speech recognition engine 760 performs speech recognition on a subset of the portions of audio as discussed with reference to FIG. 3B. The labelling engine 765 labels the transcribed text and the labels are stored in the long-term cloud storage 740.

Example Moderation Process

Figure 8:
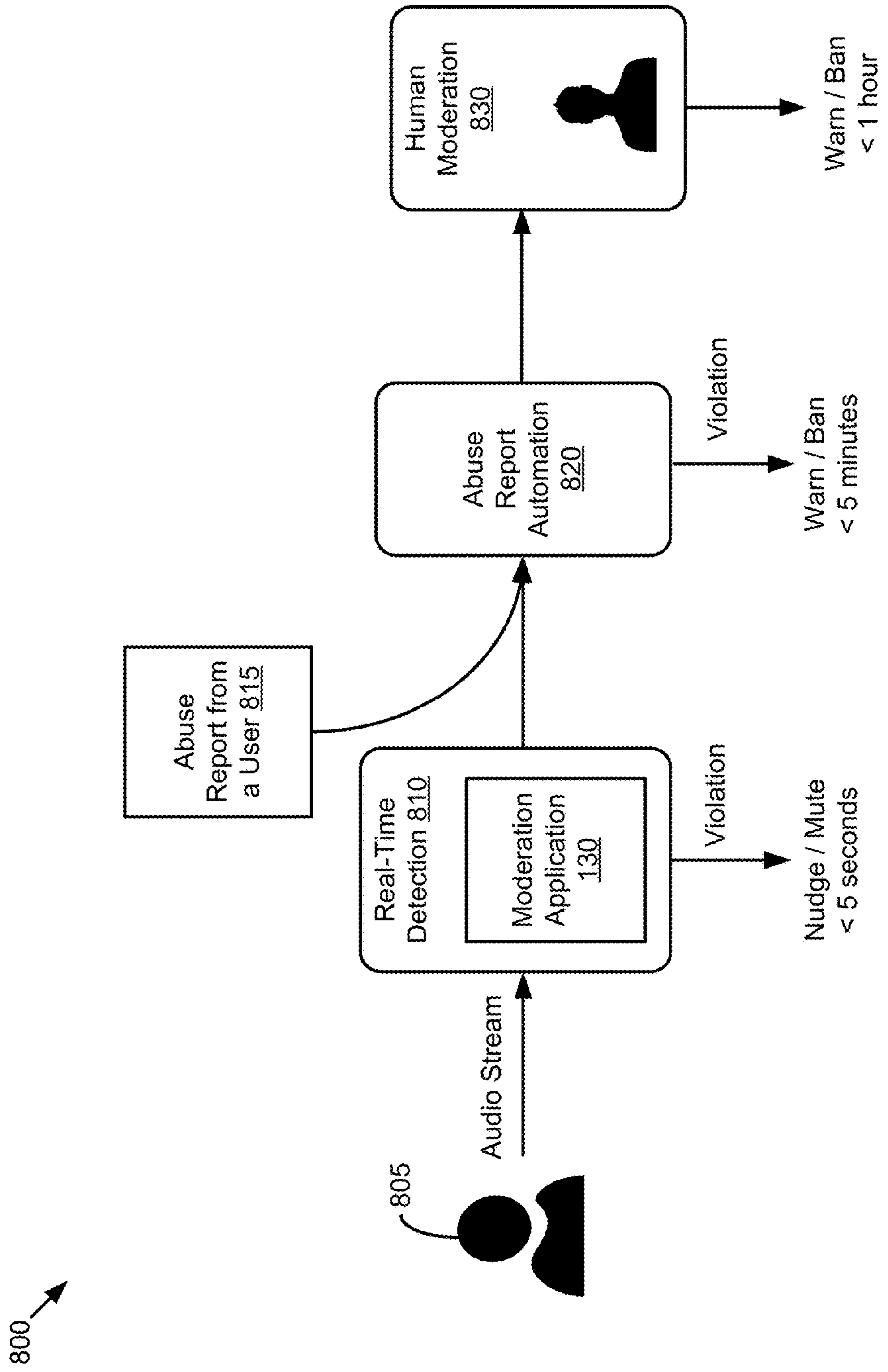
FIG. 8 illustrates an example process for moderating audio streams, according to some embodiments described herein.

FIG. 8 illustrates an example process 800 for moderating audio streams. When a user 805 speaks (generates an audio stream that is sent to the platform), real-time detection 810 is performed on the audio stream by the moderation application 130, which outputs a determination of abuse. If the determination of abuse is a violation, the abuse detection module 208 may provide a nudge or mute the user for a short period, e.g., less than five seconds.

If the audio stream triggers an abuse report from another user 805, it may trigger an abuse report automation 820. In some embodiments, the submission of an abuse report 815 may result in the abuse detection module 208 imposing a warning or a ban for less than five minutes. For example, if the abuse detection module 208 determines three sexual and profanity abuses occurred and another user submitted an abuse report, the user may be blocked from the virtual environment for 24 hours.

In some embodiments, the audio stream and the abuse report are transmitted for human moderation 830. The human moderator reviews the audio stream and may impose a warning or a ban of less than an hour. In some embodiments, the human moderator also labels the audio stream with different toxic labels, which are then used by the audio machine-learning model as ground truth data for training purposes.

The abuse detection module 208 determines a remedial action to take against a user based on the audio machine-learning model outputting a determination that the user committed an abuse. For example, if the abuse detection module 208 identifies three abuses within five minutes, the abuse detection module 208 blocks the user from speaking for 24 hours. In another example, if the abuse detection module 208 determines that a user committed abuses in multiple categories within 24 hours after the user was previously muted or blocked for committing abuse, the user is permanently banned from their user account.

In some embodiments, the abuse detection module 208 applies different sets of rules based on the age of the first player. In some embodiments, the rules are different for the following groups: 13-16, 16-18, or over 18 years old. For example, if a first user is 18 or over, the consequences for the first user committing abuse may escalate faster than if the first user was a minor. Other age groupings, and other demographic factors (e.g., gender, sexual orientation, location, participation history on the platform, etc.) may be used additionally or alternatively.

The abuse detection module 208 receives the request to report abuse. In some embodiments, the abuse detection module 208 transmits the audio stream that was identified in the abuse report to a moderator that reviews the audio and makes a determination of whether abuse occurred.

In some embodiments, the abuse detection module 208 may provide a warning to the first user responsive to certain user signals, such as when the first user is muted by two or more second users within the last 24 hours or based on obtaining a recommendation from the audio-classifier model. In some embodiments, the abuse detection module 208 performs stronger remedial actions in response to the use of certain words.

The abuse detection module 208 may provide a series of warnings responsive to the user signals. For example, within a particular time window, such as a two-hour time window, the abuse detection module 208 may provide up to four warnings with at least a one-minute cool down period between warnings. In some embodiments, the abuse detection module 208 may instruct the user interface module 202 to generate a first type of warning that takes up a small portion of the screen for the first two instances and a second type of warning that takes up a large part of the screen and requires an affirmative response from the first user for the third and fourth instances.

In some embodiments, the abuse detection module 208 may provide the warning to the first user the first time that the abuse detection module 208 determines that the user is committing abuse before imposing a remedial action.

Example User Interface

Figure 9:
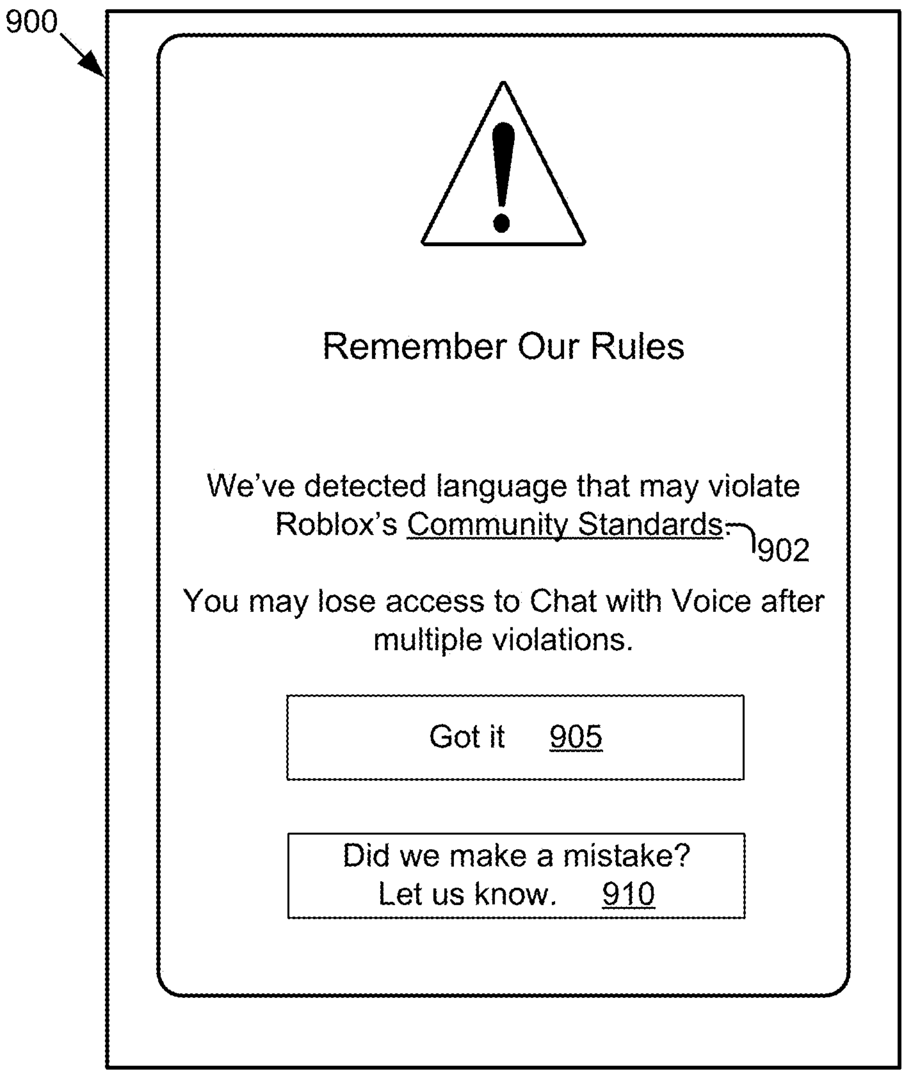
FIG. 9 illustrates an example user interface that warns the user that their language may result in a remedial action, according to some embodiments described herein.

FIG. 9 illustrates an example user interface 900 that warns the first user that their language may result in a remedial action. In this example, the user interface 900 includes a general warning that the first user has used language that violates community standards and a link 9702 to the community standards. Clicking on the link 902 may take the user to a different page with all the community standards.

The user interface 900 also includes an agreement button 905 indicating that the first user acknowledges the warning. In some embodiments, the user interface includes a list of example words that the first user spoke (not shown) that are in violation of the community standards. If the first user disagrees with the warning, the first user may click on the disagreement button 910 with the text "Did we make a mistake? Let us know." In some embodiments, the abuse detection module 208 tracks the percentage of time the first user selects the agreement button 905 versus the disagreement button 910.

The remedial action may take several forms and be based on whether the first user is associated with previous remedial actions. In some embodiments, the abuse detection module 208 enacts a temporary ban for initial violations and permanent bans for more severe violations and/or repeat violations. The ban may be an audio ban that prevents the first user from accessing their audio, while still being allowed to participate in a virtual experience, or a player ban that prevents the first user from engaging with the virtual experience for a period of time. For example, the player ban may include disabling login credentials.

In some embodiments, the first time that a first user experiences a remedial action, the abuse detection module 208 may impose a first temporary ban (e.g., a one-day ban). The second time that the first user experiences a remedial action, the abuse detection module 208 may impose a second temporary ban, where the second temporary ban is longer than the first temporary ban (e.g., a three-day ban). The third time that the first user experiences a remedial action, the abuse detection module 208 may impose a permanent ban. In some embodiments, the permanent ban is permanent in that it the length of the ban is indeterminant, although the permanent ban may be lifted by the abuse detection module 208 based on other factors (e.g., responsive to the first user successfully appealing the permanent ban).

In some embodiments, after imposing a remedial action, the user interface module 202 generates graphical data for displaying a user interface that includes an explanation of the abuse that resulted in the remedial action.

Example Methods

Figure 10:
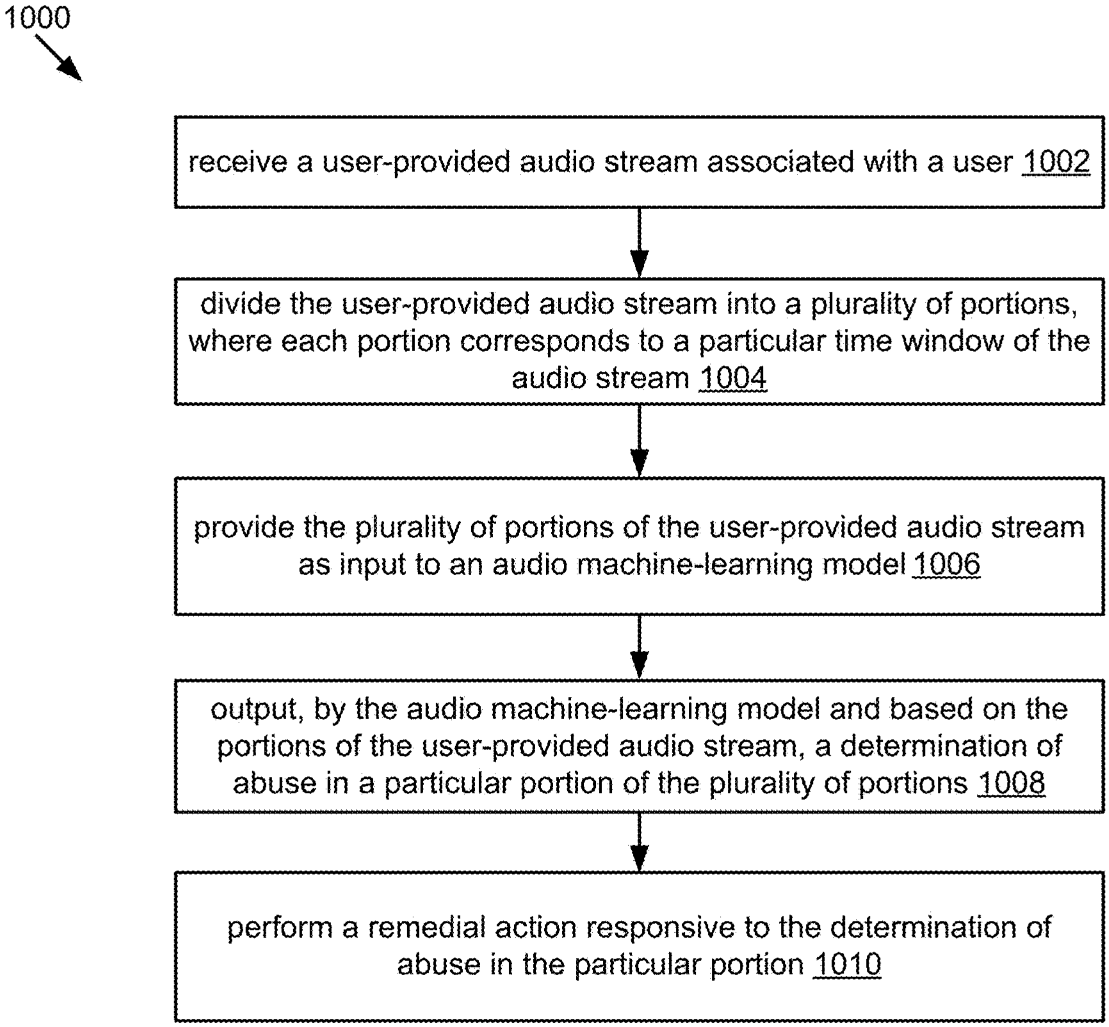
FIG. 10 is a flowchart of an example method to generate training data for an audio machine-learning model, according to some embodiments described herein.

FIG. 10 is a flowchart of an example method to generate training data for an audio machine-learning model, according to some embodiments described herein. The method 1000 may be performed by the computing device 200 in FIG. 2.

The method 1000 may begin with block 1002. At block 1002, a user-provided audio stream associated with a user is received. In some embodiments, prior to receiving the user-provided audio stream, the method 1000 further includes filtering, by a voice activity detection (VAD) model, the user-provided audio stream to remove parts of the audio stream that do not include human speech. In some embodiments, the method 1000 further includes filtering the user-provided audio stream to remove background noise. Block 1002 may be followed by block 1004.

At block 1004, the user-provided audio stream is divided into a plurality of portions, where each portion corresponds to a particular time window of the audio stream. Block 1004 may be followed by block 1006.

At block 1006, the plurality of portions of the user-provided audio stream are provided as input to an audio machine-learning model. Block 1006 may be followed by block 1008.

At block 1008, the audio machine-learning model outputs, based on the portions of the user-provided audio stream, a determination of abuse in a particular portion of the plurality of portions. The determination of abuse may include an identification of a type of abuse, the type of abuse selected from a group of one or more of profanity, bullying, harassment, sexism, and combinations thereof. Block 1008 may be followed by block 1010.

At block 1010, a remedial action is performed responsive to the determination of abuse in the particular portion. The remedial action may include providing a warning to the user. The remedial action may include at least one of causing a microphone on a user device associated with the user to be muted or suppressing the user-provided audio stream from being delivered to one or more other users.

Figure 11:
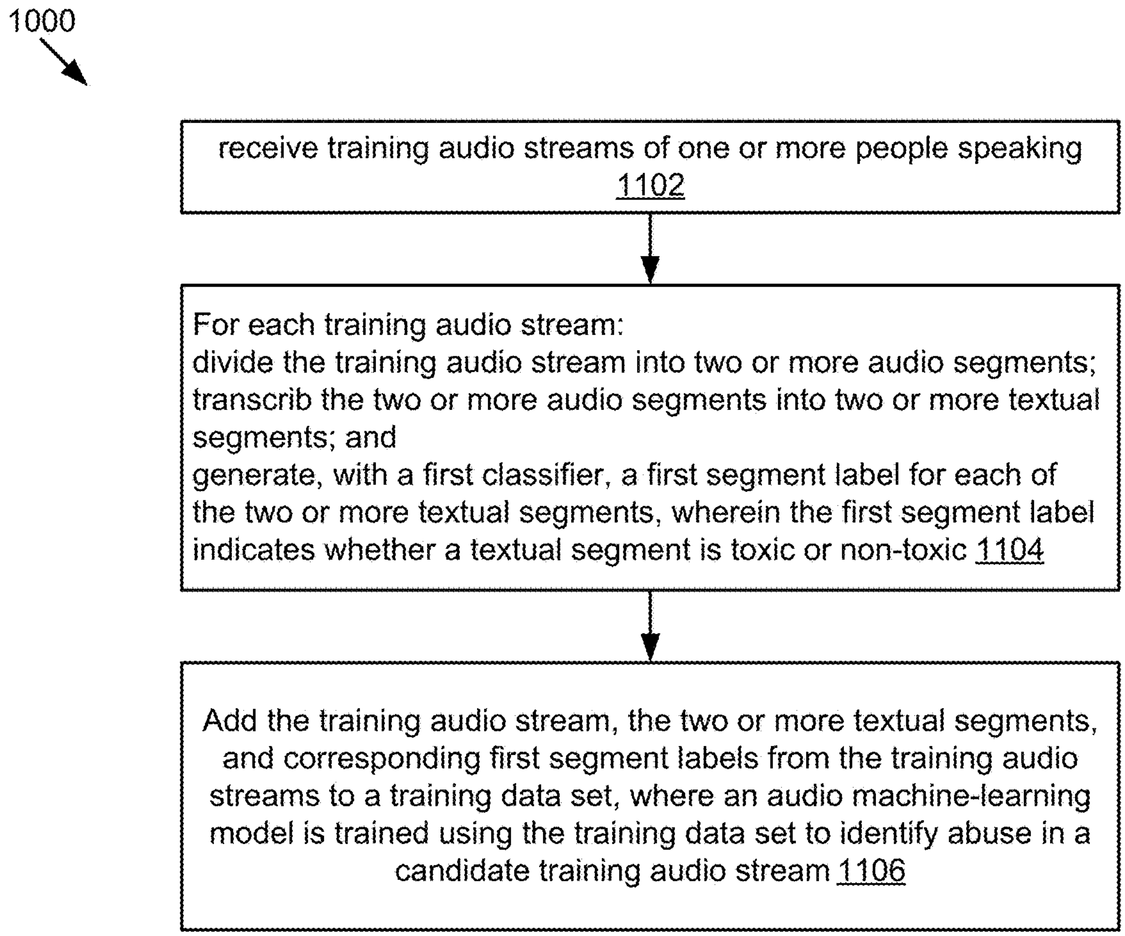
FIG. 11 is a flowchart of an example method to train an audio machine-learning model to identify toxicity in an audio stream, according to some embodiments described herein.

FIG. 11 is a flowchart of an example method to train an audio machine-learning model to identify toxicity in an audio stream, according to some embodiments described herein. The method 1100 may be performed by the computing device 200 in FIG. 2.

The method 1100 may start with block 1102. At block 1102, training audio streams of one or more people speaking is received. Block 1102 may be followed by block 1104.

At block 1104, for each training audio stream: the training audio stream is divided into two or more audio segments; the two or more audio segments are transcribed into two or more textual segments; and a first classifier generates a first segment label for each of the two or more textual segments, where the first segment label indicates whether a textual segment is toxic or non-toxic. In some embodiments, when the first segment labels indicates that a textual segment is toxic, the first segment label further indicates a category selected from a group of bullying, profanity, racism, harassment, sexism, or combinations thereof. Block 1104 may be followed by block 1106.

At block 1106, the training audio stream, the two or more textual segments, and corresponding first segment labels from the training audio streams are added to a training data set, where an audio machine-learning model is trained using the training data set to identify abuse in a candidate training audio stream.

In some embodiments, the method 1100 further includes identifying, from the training audio streams, a subset of the training audio streams where one or more of the first segment labels indicate that one or more of the textual segments is toxic; generating, with a second classifier, second segment labels for the subset of the training audio streams, wherein the second classifier is more accurate at identifying instances of abuse than the first classifier; and adding the second segment labels to the training set. In some embodiments, the method 1100 further includes generating keyword labels for each word in the two or more textual segments, where the two or more textual segments and corresponding first segment labels that are added to the training data set further include the keyword labels.

In some embodiments, the method 1100 further includes generating synthetic training audio by: providing voice chat audio to an automatic speech recognition (ASR) system; outputting, by the ASR system, transcribed audio based on the voice chat audio; providing the transcribed audio and a prompt specifying new text characteristics to a large language model (LLM), the LLM configured to generate new text based on the prompt and the transcribed audio; providing the voice chat audio to a voice cloner that outputs audio tokens that preserve speaker characteristics in the voice chat audio; providing the new text and the audio tokens as input to a text to speech system; and outputting, by the text to speech system, the synthetic training. In some embodiments, the new text characteristics correspond to one or more selected from a group of racism, grooming, drugs, alcohol, self-harm, radicalization, or combinations thereof.

Figure 12:
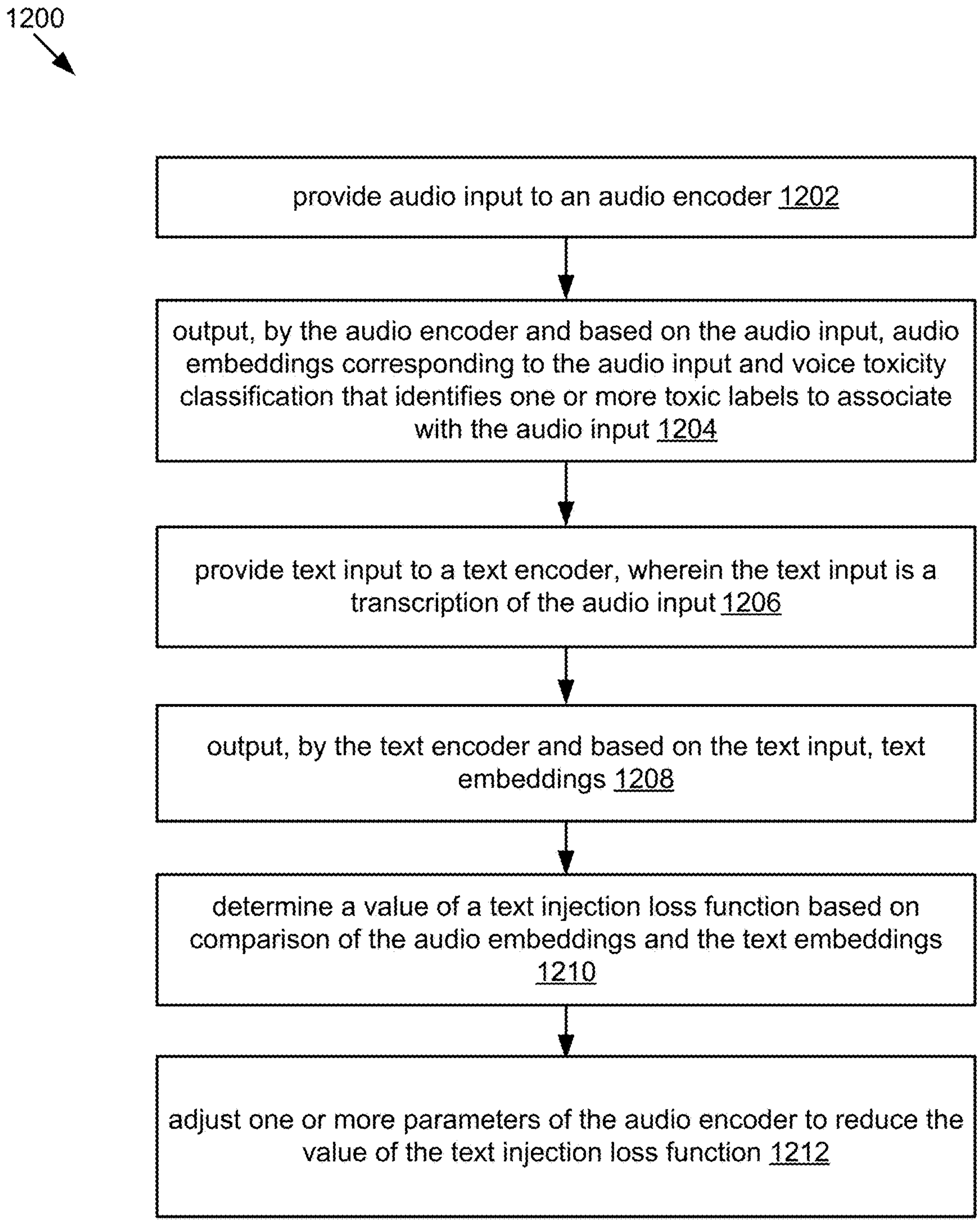
FIG. 12 is a flowchart of an example method to moderate audio streams, according to some embodiments described herein.

FIG. 12 is a flowchart of an example method to moderate audio streams, according to some embodiments described herein. The method 1200 may be performed by the computing device 200 in FIG. 2.

The method 1200 may begin with block 1202. At block 1202, audio input is provided to an audio encoder. Block 1202 may be followed by block 1204.

At block 1204, the audio encoder outputs, based on the audio input, audio embeddings corresponding to the audio input and voice toxicity classification that identifies one or more toxic labels to associate with the audio input. Block 1204 may be followed by block 1206.

At block 1206, text input is provided to a text encoder, wherein the text input is a transcription of the audio input. Block 1206 may be followed by block 1208.

At block 1208, the text encoder outputs, based on the text input, text embeddings. Block 1208 may be followed by block 1210.

At block 1210, a value of a text injection loss function is determined based on comparison of the audio embeddings and the text embeddings. Block 1210 may be followed by block 1212.

At block 1212, one or more parameters of the audio encoder are adjusted to reduce the value of the text injection loss function.

In some embodiments, the audio input includes real-world audio associated with abuse reports from one or more users and the method 1200 further includes comparing the voice toxicity classification to labels associated with the real-world audio to determine a value of a classifier loss function, wherein the labels associated with the real-world audio are ground truth provided by human reviewers; and adjusting parameters of the audio encoder to reduce the value of the classifier loss function. In some embodiments, the classifier loss function is binary cross entropy loss and the text injection loss function is means squared error (MSE) loss. In some embodiments, the method 1200 further includes generating a combined loss function that is based on a linear combination of the classifier loss function and the text injection loss function with a hyperparameter. In some embodiments, the audio encoder is trained using contrastive loss for each speech segment and a transcript for the speech segment.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various embodiments. In some embodiments, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., client device 110 only; client+server device; etc.) and where the data analysis is performed (e.g., client device 110 only; client+server device; etc.). Data is utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one embodiments of the description. The appearances of the segment "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to moderate audio streams, the method comprising:
- generating synthetic training data by:
  - identifying, from current training data, a particular toxicity category of a plurality of toxicity categories that is associated with fewer examples in the current training data than remaining toxicity categories of the plurality of toxicity categories;
  - providing voice chat audio for the particular toxicity category to an automatic speech recognition (ASR) system;
  - outputting, by the ASR system, transcribed audio based on the voice chat audio for the particular toxicity category;
  - providing the transcribed audio and a prompt including an instruction to generate variations of the transcribed audio to a large language model (LLM), the LLM configured to generate the variations based on the prompt and the transcribed audio;
  - providing the voice chat audio to a voice cloner that outputs audio tokens that preserve speaker characteristics in the voice chat audio;
  - providing the variations and the audio tokens as input to a text to speech system; and
  - outputting, by the text to speech system, the synthetic training data;
- training an audio machine-learning model using the synthetic training data;
- receiving a user-provided audio stream associated with a user;
- dividing the user-provided audio stream into a plurality of portions, wherein each portion corresponds to a particular time window of the audio stream;

providing the plurality of portions of the user-provided audio stream as input to the trained audio machine-learning model;

outputting, by the trained audio machine-learning model and based on the portions of the user-provided audio stream, a determination of abuse in a particular portion of the plurality of portions; and performing a remedial action responsive to the determination of abuse in the particular portion.

2. The method of claim 1, wherein the audio machine-learning model is trained by:

providing audio input to an audio encoder;

outputting, by the audio encoder and based on the audio input, audio embeddings corresponding to the audio input and a voice toxicity classification that identifies one or more toxic labels to associate with the audio input;

providing text input to a text encoder, wherein the text input is a transcription of the audio input;

outputting, by the text encoder and based on the text input, text embeddings;

determining a value of a text injection loss function based on comparison of the audio embeddings and the text embeddings; and adjusting one or more parameters of the audio encoder to reduce the value of the text injection loss function.

3. The method of claim 2, wherein the audio input includes real-world audio associated with abuse reports from one or more users and the method further comprises:

comparing the voice toxicity classification to labels associated with the real-world audio to determine a value of a classifier loss function, wherein the labels associated with the real-world audio are ground truth provided by human reviewers; and adjusting the one or more parameters of the audio encoder to reduce the value of the classifier loss function.

4. The method of claim 1, wherein the audio machine-learning model is further trained using additional training data and the method further comprises generating the additional training data by:

receiving training audio streams of one or more people speaking;

for each training audio stream:

dividing the training audio stream into two or more audio segments;

transcribing the two or more audio segments into two or more textual segments; and generating, with a first classifier, a first segment label for each of the two or more textual segments, wherein the first segment label indicates whether a respective textual segment is toxic or non-toxic; and adding the training audio stream, the two or more textual segments, and corresponding first segment labels from the training audio streams to the additional training data.

5. The method of claim 4, wherein generating the additional training data further includes:

identifying, from the training audio streams, a subset of the training audio streams where one or more of the first segment labels indicate that one or more of the textual segments is toxic;

generating, with a second classifier, second segment labels for the subset of the training audio streams, wherein the second classifier is more accurate at identifying instances of abuse than the first classifier; and adding the second segment labels to the additional training data.

6. The method of claim 1, wherein the voice chat audio is extracted from various participants in virtual experiences.

7. The method of claim 1, wherein the remedial action includes providing a warning to the user.

8. The method of claim 1, wherein the remedial action includes at least one of: causing a microphone on a user device associated with the user to be muted or suppressing the user-provided audio stream from being delivered to one or more other users.

9. The method of claim 1, wherein the determination of abuse includes an identification of a type of abuse, the type of abuse selected from a group of one or more of profanity, bullying, harassment, sexism, and combinations thereof.

10. The method of claim 1, wherein prior to dividing the user-provided audio stream, the method further comprises filtering, by a voice activity detection (VAD) model, the user-provided audio stream to remove parts of the audio stream that do not include human speech.

11. The method of claim 1, further comprising filtering the user-provided audio stream to remove background noise.

12. A system to train an audio machine-learning model comprising:

one or more processors; and a memory coupled to the one or more processors, with instructions stored thereon that, when executed by the one or more processors, cause the one or more processors to perform operations comprising:

generating synthetic training data by:

identifying, from current training data, a particular toxicity category of a plurality of toxicity categories that is associated with fewer examples in the current training data than remaining toxicity categories of the plurality of toxicity categories;

providing voice chat audio for the particular toxicity category to an automatic speech recognition (ASR) system;

outputting, by the ASR system, transcribed audio based on the voice chat audio for the particular toxicity category;

providing the transcribed audio and a prompt specifying new text characteristics to a large language model (LLM), the LLM configured to generate new text based on the prompt and the transcribed audio;

providing the voice chat audio to a voice cloner that outputs audio tokens that preserve speaker characteristics in the voice chat audio;

providing the new text and the audio tokens as input to a text to speech system; and outputting, by the text to speech system, the synthetic training data;

training the audio machine-learning model using the synthetic training data;

receiving a user-provided audio stream associated with a user;

dividing the user-provided audio stream into a plurality of portions, wherein each portion corresponds to a particular time window of the audio stream;

providing the plurality of portions of the user-provided audio stream as input to the trained audio machine-learning model;

outputting, by the trained audio machine-learning model and based on the portions of the user-provided audio stream, a determination of abuse in a particular portion of the plurality of portions; and performing a remedial action responsive to the determination of abuse in the particular portion.

13. The system of claim 12, wherein the audio machine-learning model is trained by:
providing audio input to an audio encoder;
outputting, by the audio encoder and based on the audio input, audio embeddings corresponding to the audio input and a voice toxicity classification that identifies one or more toxic labels to associate with the audio input;
providing text input to a text encoder, wherein the text input is a transcription of the audio input;
outputting, by the text encoder and based on the text input, text embeddings;
determining a value of a text injection loss function based on comparison of the audio embeddings and the text embeddings; and
adjusting one or more parameters of the audio encoder to reduce the value of the text injection loss function.

14. The system of claim 13, wherein the audio input includes real-world audio associated with abuse reports from one or more users and the operations further comprise:
comparing the voice toxicity classification to labels associated with the real-world audio to determine a value of a classifier loss function, wherein the labels associated with the real-world audio are ground truth provided by human reviewers; and
adjusting the one or more parameters of the audio encoder to reduce the value of the classifier loss function.

15. The system of claim 12, wherein the audio machine-learning model is further trained using additional training data and the operations further comprise generating the additional training data by:
receiving training audio streams of one or more people speaking;
for each training audio stream:
dividing the training audio stream into two or more audio segments;
transcribing the two or more audio segments into two or more textual segments; and
generating, with a first classifier, a first segment label for each of the two or more textual segments, wherein the first segment label indicates whether a respective textual segment is toxic or non-toxic; and
adding the training audio stream, the two or more textual segments, and corresponding first segment labels from the training audio streams to the additional training data.

16. A non-transitory computer-readable medium with instructions stored thereon that, when executed by one or more computers, cause the one or more computers to perform operations, the operations comprising:
generating synthetic training data by:
identifying, from current training data, a particular toxicity category of a plurality of toxicity categories that is associated with fewer examples in the current training data than remaining toxicity categories of the plurality of toxicity categories;
providing voice chat audio for the particular toxicity category to an automatic speech recognition (ASR) system;
outputting, by the ASR system, transcribed audio based on the voice chat audio for the particular toxicity category;
providing the transcribed audio and a prompt including an instruction to generate variations of the transcribed audio to a large language model (LLM), the LLM configured to generate the variations based on the prompt and the transcribed audio;
providing the voice chat audio to a voice cloner that outputs audio tokens that preserve speaker characteristics in the voice chat audio;
providing the variations and the audio tokens as input to a text to speech system; and
outputting, by the text to speech system, the synthetic training data;
training an audio machine-learning model using the synthetic training data;
receiving a user-provided audio stream associated with a user;
dividing the user-provided audio stream into a plurality of portions, wherein each portion corresponds to a particular time window of the audio stream;
providing the plurality of portions of the user-provided audio stream as input to the trained audio machine-learning model;
outputting, by the trained audio machine-learning model and based on the portions of the user-provided audio stream, a determination of abuse in a particular portion of the plurality of portions; and
performing a remedial action responsive to the determination of abuse in the particular portion.

17. The non-transitory computer-readable medium of claim 16, wherein the audio machine-learning model is trained by:
providing audio input to an audio encoder;
outputting, by the audio encoder and based on the audio input, audio embeddings corresponding to the audio input and a voice toxicity classification that identifies one or more toxic labels to associate with the audio input;
providing text input to a text encoder, wherein the text input is a transcription of the audio input;
outputting, by the text encoder and based on the text input, text embeddings;
determining a value of a text injection loss function based on comparison of the audio embeddings and the text embeddings; and
adjusting one or more parameters of the audio encoder to reduce the value of the text injection loss function.

18. The non-transitory computer-readable medium of claim 17, wherein the audio input includes real-world audio associated with abuse reports from one or more users and the operations further comprise:
comparing the voice toxicity classification to labels associated with the real-world audio to determine a value of a classifier loss function, wherein the labels associated with the real-world audio are ground truth provided by human reviewers; and
adjusting the one or more parameters of the audio encoder to reduce the value of the classifier loss function.

19. The non-transitory computer-readable medium of claim 16, wherein the audio machine-learning model is further trained using additional training data and the operations further comprise generating the additional training data by:
receiving training audio streams of one or more people speaking;
for each training audio stream:
dividing the training audio stream into two or more audio segments;
transcribing the two or more audio segments into two or more textual segments; and
generating, with a first classifier, a first segment label for each of the two or more textual segments, wherein the first segment label indicates whether a respective textual segment is toxic or non-toxic; and adding the training audio stream, the two or more textual segments, and corresponding first segment labels from the training audio streams to the additional training data.

20. The non-transitory computer-readable medium of claim 16, wherein the remedial action includes providing a warning to the user.

* * * * *